United States Patent [19]

Sasaki

[11] Patent Number: 5,140,440
[45] Date of Patent: Aug. 18, 1992

[54] METHOD OF DETECTING A PROCESSING AREA OF A DOCUMENT FOR AN IMAGE FORMING APPARATUS

[75] Inventor: Tomio Sasaki, Tokyo, Japan

[73] Assignee: Ricoh Company, Ltd., Tokyo, Japan

[21] Appl. No.: 501,281

[22] Filed: Mar. 28, 1990

[30] Foreign Application Priority Data

| Mar. 28, 1989 | [JP] | Japan | 1-74084 |
| Mar. 28, 1989 | [JP] | Japan | 1-74085 |
| Jun. 29, 1989 | [JP] | Japan | 1-165375 |
| Oct. 12, 1989 | [JP] | Japan | 1-264006 |

[51] Int. Cl.$^5$ .............................. H04M 1/00
[52] U.S. Cl. .............................. 358/453; 358/452
[58] Field of Search .............................. 358/452, 453

[56] References Cited

U.S. PATENT DOCUMENTS

| 4,538,183 | 8/1988 | Kanno et al. | 358/452 |
| 4,733,304 | 3/1988 | Homma et al. | 358/452 |
| 4,985,930 | 1/1991 | Takeda et al. | 358/452 |

*Primary Examiner*—Edward L. Coles, Sr.
*Attorney, Agent, or Firm*—Oblon, Spivak, McClelland, Maier & Neustadt

[57] ABSTRACT

A method of detecting a particular area of a document where an image to be processed exists, and applicable to an image forming apparatus. Image information representative of an image printed on a document and position information representative of a marked area of the image data are detected. The image information lying in the marked area is extracted, erased, inverted as to black and white or otherwise processed on the basis of the detected image information and position information and without a mark being directly written on the document.

6 Claims, 35 Drawing Sheets

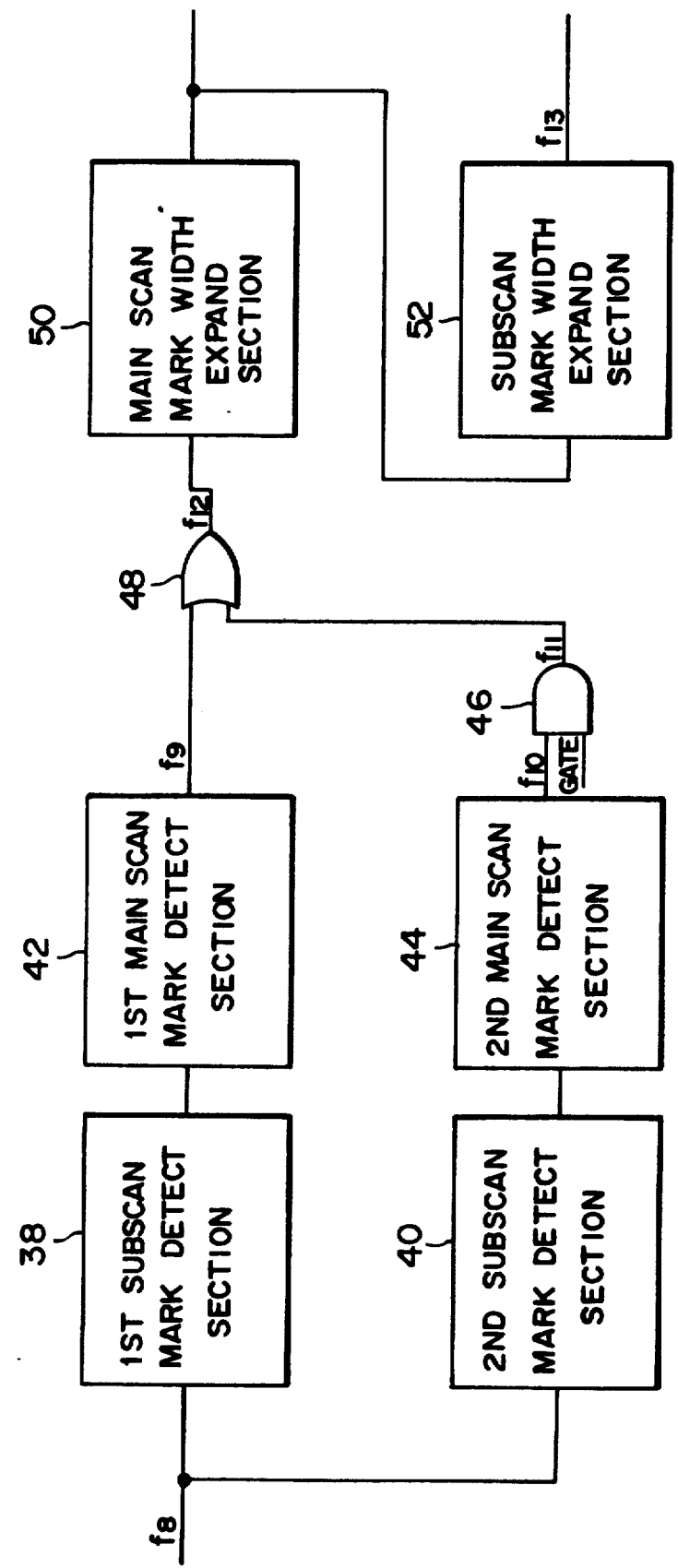
F/G.5

FIG.16

| K | M1 | M2 | M3 | d OUTPUT |
|---|----|----|----|----------|
| O | O  | O  | O  | CHARACTER OUTPUT |
| —  | O  | O  | O  | HALFTONE OUTPUT |
| O | —  | O  | O  | MASKING |
| O | O  | —  | O  | TRIMMING |
| O | —  | —  | O  | BLACK-AND-WHITE INVERSION INSIDE OF MARKER, VIDEO DATA OUTSIDE OF MARKER |
| O | O  | O  | —  | BLACK-AND-WHITE INVERSION OUTSIDE OF MARKER, VIDEO DATA INSIDE OF MARKER |
| O | —  | O  | —  | BLACK-AND-WHITE INVERSION INSIDE OF TRIMMING MARKER |
| O | O  | —  | —  | BLACK-AND-WHITE INVERSION INSIDE OF MASKING MARKER |
| O | —  | —  | —  | MARKER AREA SIGNAL |

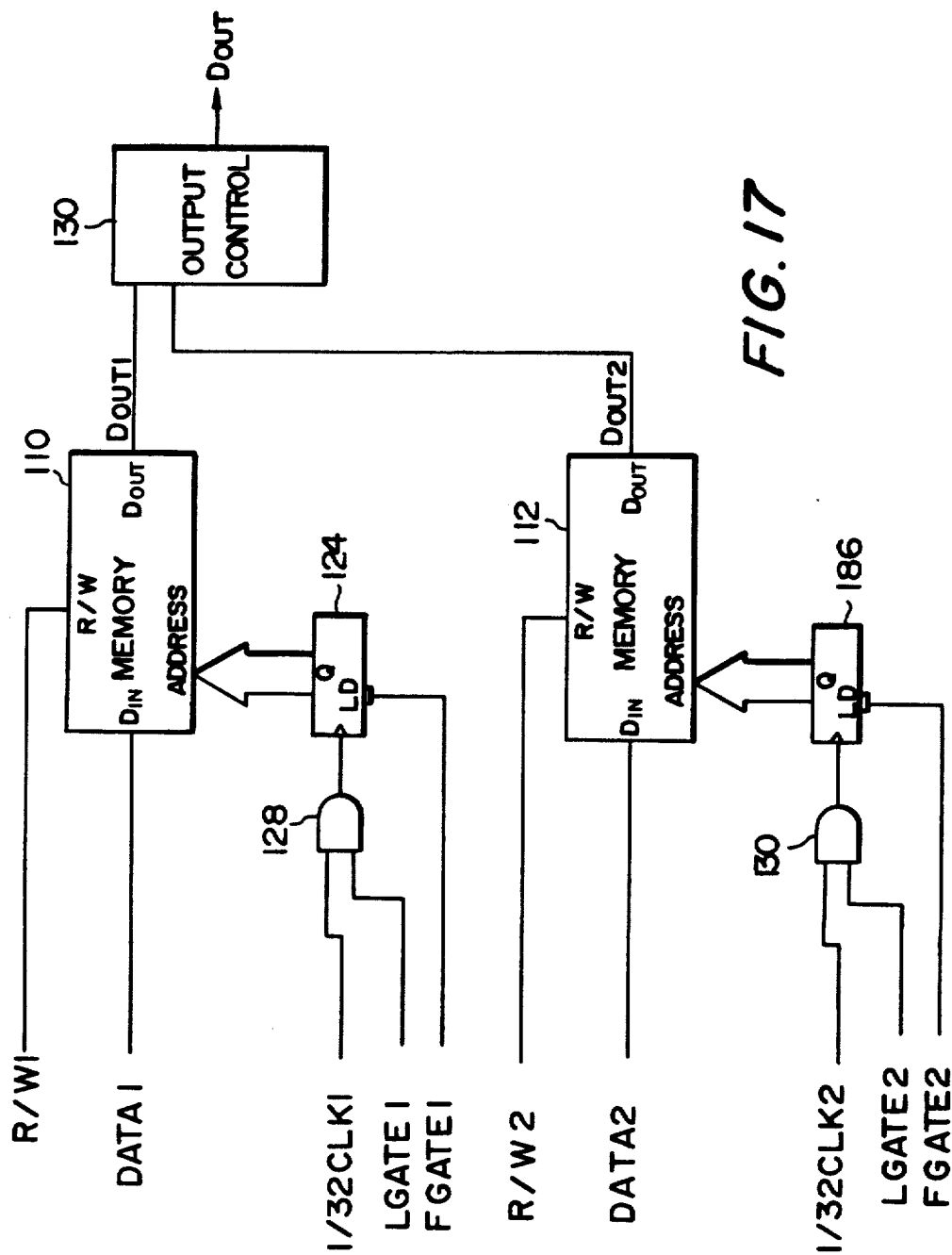

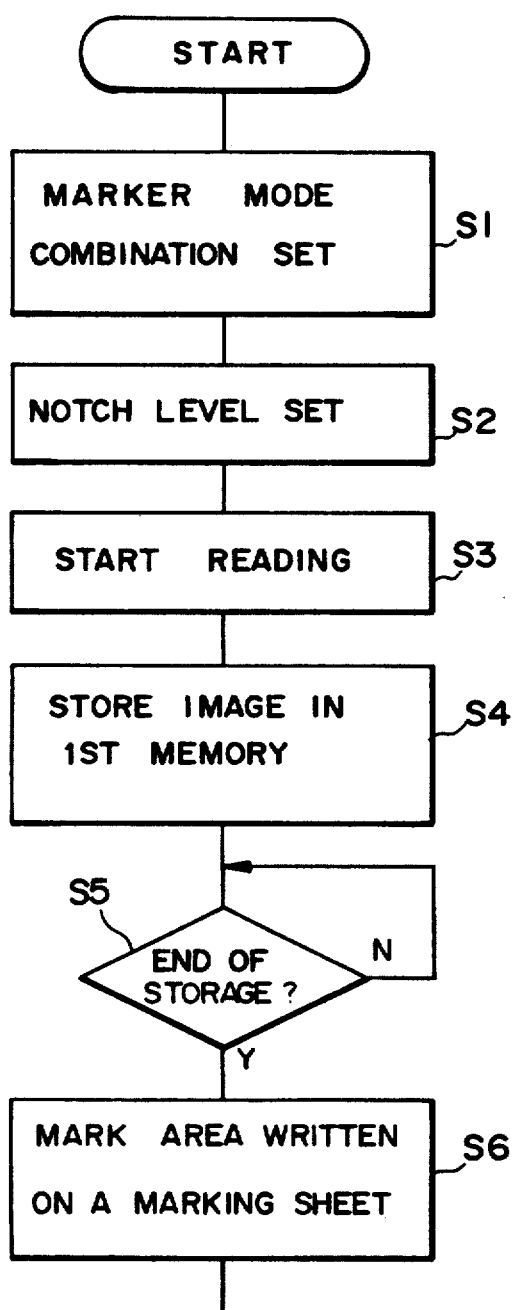
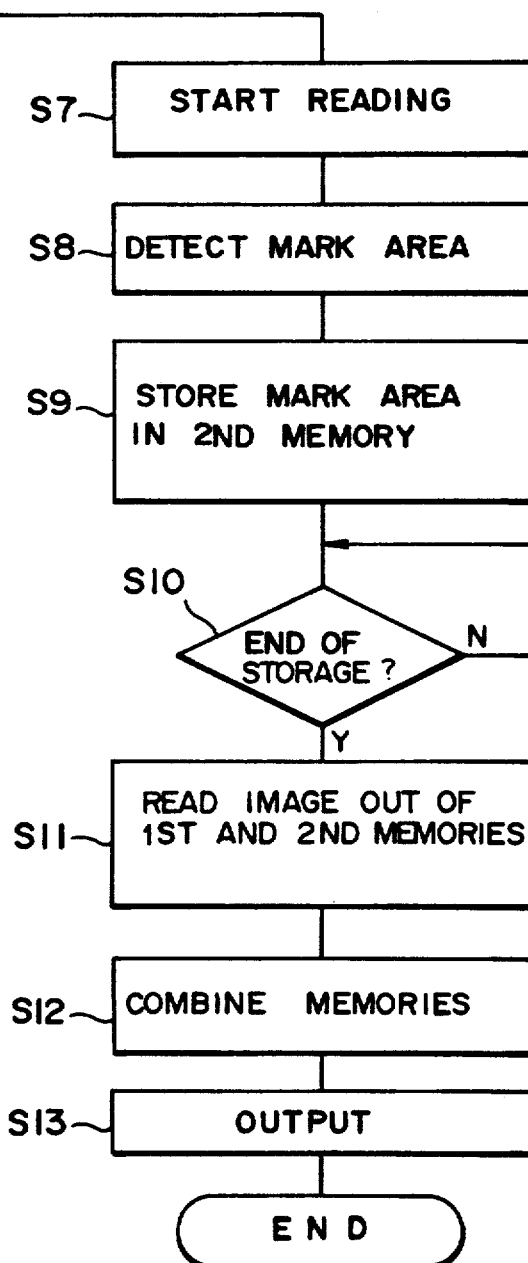
FIG. 24

METHOD OF DETECTING A PROCESSING AREA OF A DOCUMENT FOR AN IMAGE FORMING APPARATUS

BACKGROUND OF THE INVENTION

The present invention relates to a method of detecting an area of a document to be processed for an image forming apparatus and, more particularly, to a processing area detecting method which detects a marked area of a document so that image information existing therein may be extracted, erased, inverted as to black and white or otherwise processed.

Today, a digital copier, scanner input device, facsimile machine or similar image forming apparatus is extensively used. With a digital copier, for example, a person who does not want a part of image information printed on a document to be reproduced may copy the document after cutting off the part of interest or after covering it with a piece of white paper. This traditional scheme, however, has various problems left unsolved. Specifically, cutting off the needless part of a document is not only time-consuming but also impracticable without damaging the document. Covering the needless part by a piece of white paper is disadvantageous in that the white paper is apt to move to thereby prevent a plurality of copies from being provided with exactly the same appearance.

It has been customary, therefore, to mark a desired area of a document by use of a color felt pen or similar marker so that image information existing therein may be extracted, erased, inverted as to black and white or otherwise processed. However, when characters or similar image information printed on a document has the same density as the mark, the marked area cannot be detected with accuracy. Moreover, the mark is left on the document even after the latter has been copied. When the marked area is accurately detected, processing has to be executed to prevent the mark itself from being reproduced on a copy. This processing, however, brings about a problem that a part of image information of a document which has a relatively low density is not reproduced on a copy. Should such a part having a relatively low density be reproduced on a copy, the mark itself would be reproduced also. To eliminate such a dilematic situation, all the image information carried on a document may be copied, and image information on the resultant copy may be marked to specify a desired area. This, however, results in generation and, therefore, in the critical degradation of the quality of the output image.

SUMMARY OF THE INVENTION

It is therefore an object of the present invention to provide a processing area detecting method for an image forming apparatus which eliminates the drawbacks particular to the prior art as discussed above.

It is another object of the present invention to provide a processing area detecting method for an image forming apparatus which detects image information of a document and position information representative of a marked area of the image information and, based on these information, processes the marked area in a desired manner without a mark being directly written on the image information.

It is another object of the present invention to provide a processing area detecting method for an image forming apparatus which is capable of surely detecting a mark provided on a desired part of image information of a document.

It is another object of the present invention to provide a processing area detecting method for an image forming apparatus which allows a particular part of image information of a document to be marked with accuracy.

It is another object of the present invention to provide a processing area detecting method for an image forming apparatus which allows even image information of low density to be positively marked.

It is another object of the present invention to provide a processing area detecting method for an image forming apparatus which allows even a color document, photographic document or similar document to be marked.

It is another object of the present invention to provide a processing area detecting method for an image forming apparatus which eliminates wasteful consumption of paper sheets.

It is another object of the present invention to provide a generally improved processing area detecting method for an image forming apparatus.

In accordance with the present invention, a method of detecting an area of a document where an image to be processed exists comprises the steps of reading an image printed on a document to generate image information, storing the image information, reading position information associated with the document which is entered on a sheet other than the document, and processing the image information on the basis of the position information.

Also, in accordance with the present invention, a method of detecting an area of a document where an image to be processed exists comprises the steps of reading an image printed on a document, determining whether or not position information associated with the document is included in a signal representative of the document, determining whether or not a processing mode for editing an image has been set up, and discharging, when the processing mode has been set up and the position data associated with the document does not include the signal, a paper sheet for specifying the position information.

BRIEF DESCRIPTION OF THE DRAWINGS

The above and other objects, features and advantages of the present invention will become more apparent from the following detailed description taken with the accompanying drawings in which:

FIG. 5 is a block diagram schematically showing a marked area detecting circuit;

FIG. 16 is table listing editing data fed from a CPU and output data associated therewith;

FIG. 17 is a block diagram schematically showing two image memories which constitute a memory controller;

FIG. 24 is a flowchart demonstrating specific control for editing an image;

DESCRIPTION OF THE PREFERRED EMBODIMENTS

Figure 1:
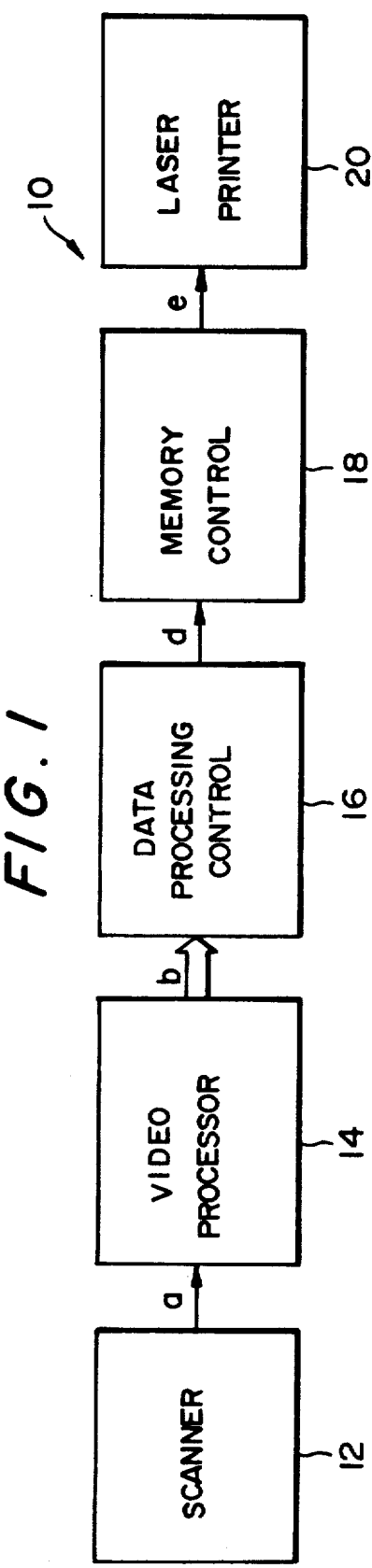
FIG. 1 is a block diagram of an image processing device to which a first embodiment of the present invention is applied.

Referring to FIG. 1 of the drawings, there is shown an image processing device for an image forming apparatus to which a first embodiment of the present invention is applied. As shown, the image processing device, generally 10, is made up of a scanner 12, a video processor 14, a data processing control 16, a memory control 18, and a laser printer 20.

Figure 2:
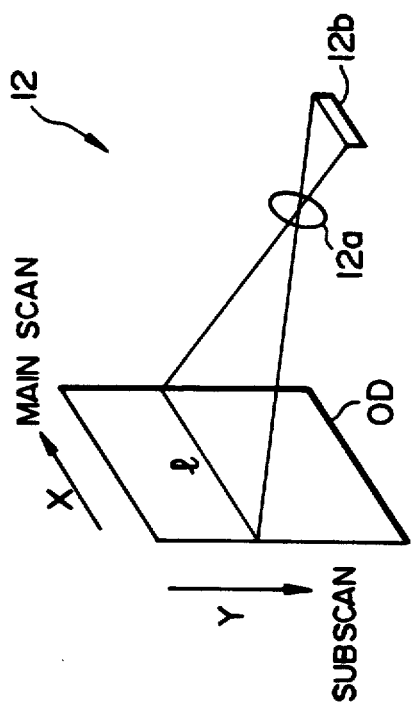
FIG. 2 is a perspective view showing how a scanner shown in FIG. 1 reads a document.

As shown in FIG. 2, the scanner 12 scans image information existing on a scanning line 1 and focuses them through a lens 12a onto a CCD (Charge Coupled Device) line sensor 12b. The relative position of a document OD and the CCD line sensor 12b in a direction Y is mechanically shifted to update the scanning line (subscanning), whereby each scanning line is read from the left to the right in a direction X at a density of 400 dots per inch which is nearly equal to sixteen pixels per millimeter (main scanning). The resultant analog output $a$ of the scanner 12 has amplitudes associated with the densities of the individual pixels. The video processor 14 transforms the analog signal $a$ into a digital signal while subjecting it to various kinds of processing such as background removal, shading correction and MTF correction, thereby producing six-bit (sixty-four tones) video data b. The greater the value of the video data b, the higher the density becomes. The data processing control 16 binarizes the video data b by assigning "1" or "H" level to black pixels and "0" or "L" level to white pixels. At the same time, the data processing control 16 extracts (trimming), erases (masking) or otherwise processes a marked area of the image to thereby produce write data d. The write data d is a mark area signal which will be described. The memory control 18 stores the write data d in a plurality of frame memories and combines the data d stored in the memories to produce a signal e. The signal e is fed to the laser printer 20. In response, the laser printer 20 prints out the image information on a paper sheet by AO-modulating a a laser beam by the sigal e ("1" and "0" representing recording and non-recording, respectively). Although not shown, a control system for controlling the sections 12 to 20 may be implemented by conventional technology and will not be described in detail. This is also true with the scanner 12, video processor 14, and laser printer 20.

The data processing control 16 detects a mark written on the document OD and whose density lies in a predetermined range or detects an area surrunded by such a mark. Based on the detected mark or the area, the data processing control 16 trims, masks or otherwise processes the document OD. In the illustrative embodiment, the mark is implemented by a color felt pen and, for this reason, it will be referred to as a color mark hereinafter. This is because color felt pens having a broad range of densities are available today and are easy to provide a mark whose density lies in a predetermined range.

Figure 3:
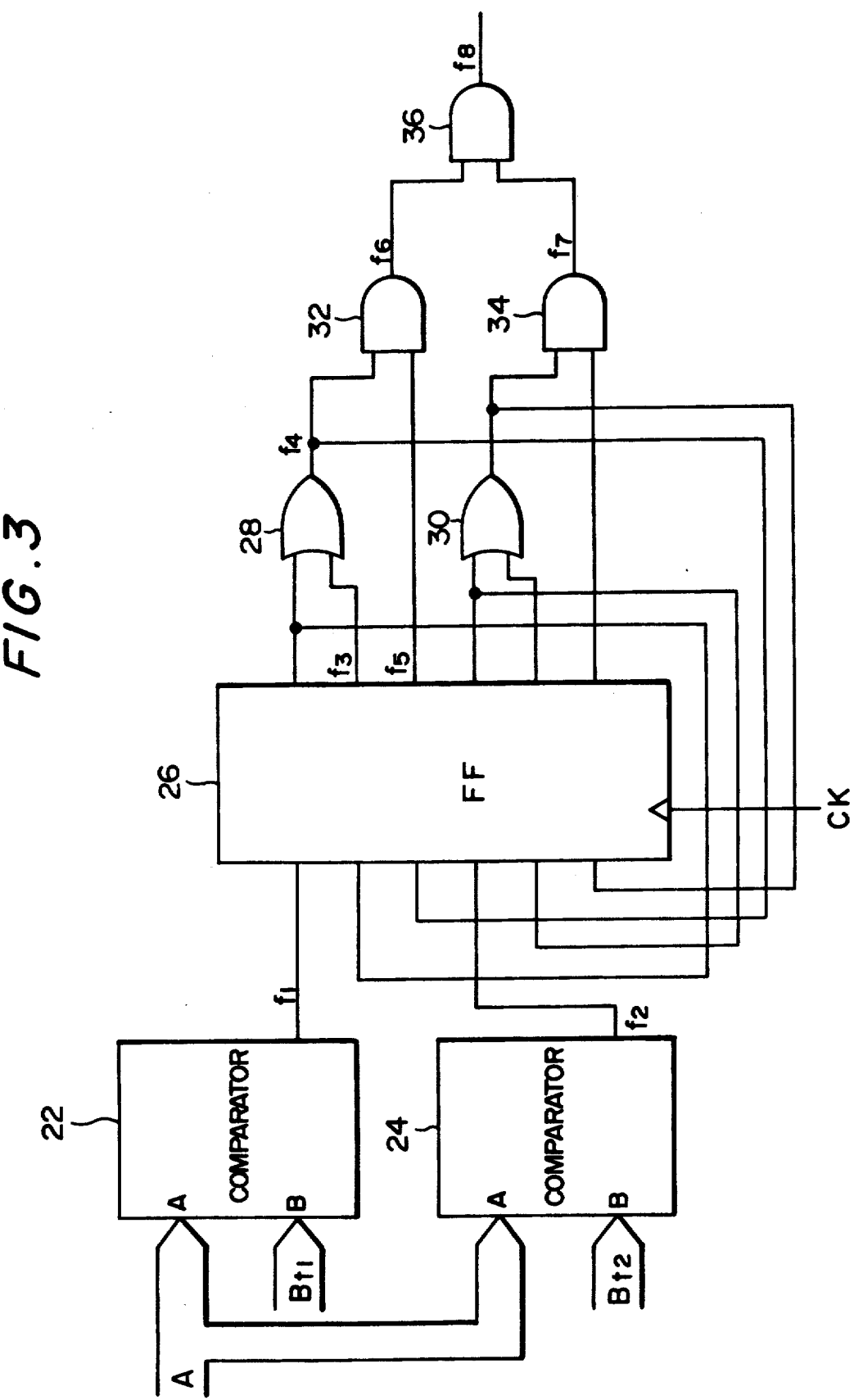
FIG. 3 is a block diagram schematically showing a density determining circuit and a 1-pixel noise removeing circuit.

Referring to FIG. 3, a density determining circuit and a one-pixel noise removing circuit will be described. Two comparators 22 and 24 shown in FIG. 3 constitute the density determining circuit which detects halftone data A. Specifically, the density determining circuit compares read data A with two different threshold levels $Bt_1$ and $Bt_2$ ($Bt_1 > Bt_2$) and thereby produces signals $f_1$ and $f_2$ which are representative of relations $Bt_1 > A$ and $Bt_2 < A$, respectively. Here, the threshold level $Bt_1$ is selected to be the same as a threshold level adapted for simple binarization. The density determining circuit, therefore, detects a comparatively thin mark which would not be determined to be black by simple binarization. The threshold level $Bt_2$ is selected in consideration of the contamination of the background, irregular density distribution, etc. A flip-flop (F/F) 26, OR gates 28 and 30, and AND gates 32 and 34 constitute the one-pixel noise removing circuit.

Figure 4:
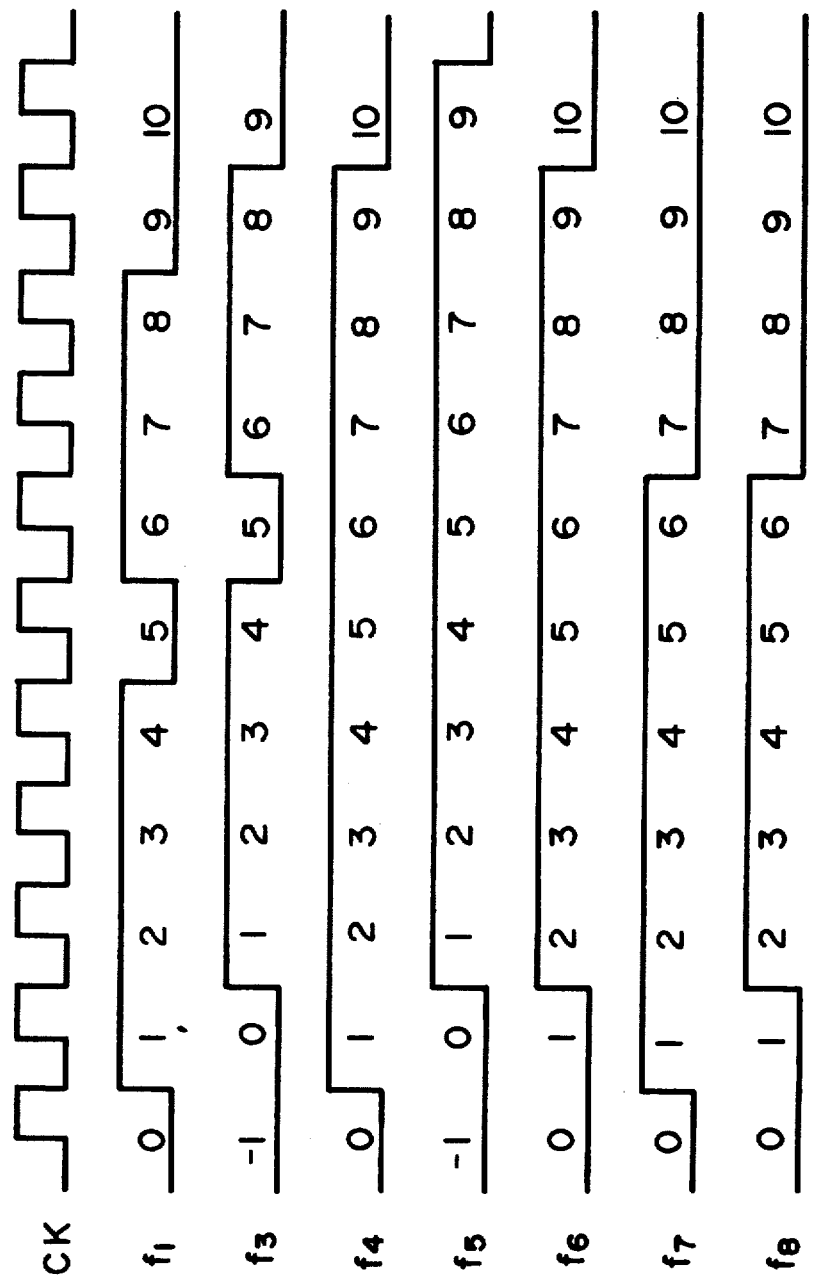
FIG. 4 is a timing chart useful for understanding 1-pixel noise removal.

One-pixel noise removal will be described with reference to FIG. 4. Assume that the signal $f_1$ changes as shown in FIG. 4. In the figure, the numerals indicate the addresses of pixels in the main scaning direction. The signal $f_1$ is shown as being "0" at the address 5 where it should be "1", due to noise. At the addresses 1 to 4 and 6 to 8, the signal $f_1$ is "1" which is representative of a color mark. A clock CK is a clock signal whose one period corresponds to one pixel in the main scanning direction. A signal $f_3$ is produced by latching one period of signal $f_1$ by the flip-flop 26. The signals $f_2$ and $f_3$ are applied to the OR gate 28 which then produces a noise-free signal $f_4$. Since the signal $f_4$ is longer than the noise-containing signal $f_1$ by one period, it is latched by the flip-flop 26 by one period to produce a signal $f_5$. This signal $f_5$ and the signal $f_4$ are fed to the AND gate 32, so that a signal $f_6$ which is free from noise and has the same length as the signal $f_1$ appears on the output of the AND gate 32. The other signal $f_2$ is processed by the flip-flop 26, OR gate 30 and AND gate 34 in the same manner as the signal $f_1$ to procuce a signal $f_7$. The resultant signals $f_6$ and $f_7$ are fed to the AND gate 36 to obtain a signal $f_8$ representative of a mark density range.

While the circuiry of FIG. 3 has been described in relation to one-pixel noise, the system may be changed to remove any desired n-pixel noise such as two-pixel or three-pixel noise. Further, the threshold levels $Bt_1$ and $Bt_2$ may be varied.

FIG. 5 depicts a mark area detecting circuit in a schematic block diagram. This circuit is constructed such that when halftone is detected in a small area of one to several pixel due to a spot on the background, the example, the circuit does not determine it to be a mark area. Specifically, only when halftone extends over more than a predetermined area, the circuit determines a certain area inclusive of that area to be a mark area. While the basic unit of the mark area is 12×12 pixels in this embodiment, it may be changed by modifying the system. The signal $f_8$ reprsentative of the mark density range is fed to a first and a second subscan mark detecting section 38 and 40, respectively.

Figure 6A:
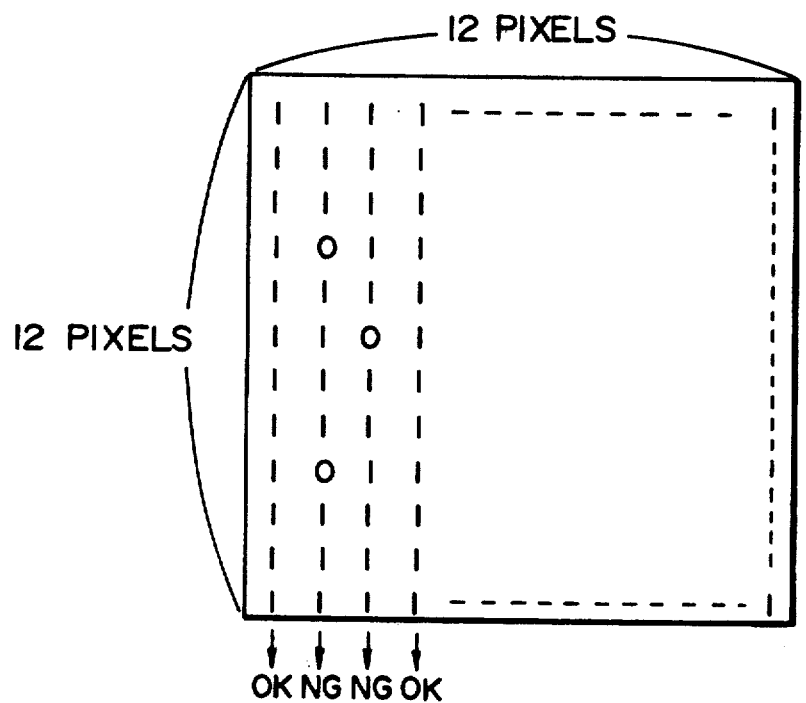
FIGS. 6A and 6B indicate first and second subscan mark detecting operations, respectively.

FIG. 6A demonstrates the operatonof the first subscan mark detecting section 38. As shown, the mark detecting section 38 scans a unit area of 12×12 pixels in the subscanning direction, i.e., a block of twelve pixels in the subscanning direction at a time. If the signal $f_8$ is "1" throughout any one of the twelve pixels block, the mark detecting section 38 determines that such a block is "OK (="1")"; if the signal $f_8$ is "0" even in one pixel of that block, the section 38 determines that the block is "NG (="0")". If all the blocks of the 12×12 pixel area are "OK", a first main scan mark detecting section 42 associated with the subscan mark detecting section 38 identifies that pixel area as a mark area and produces a signal $f_9$="1" while setting a signal GATE to "1".

Figure 6B:
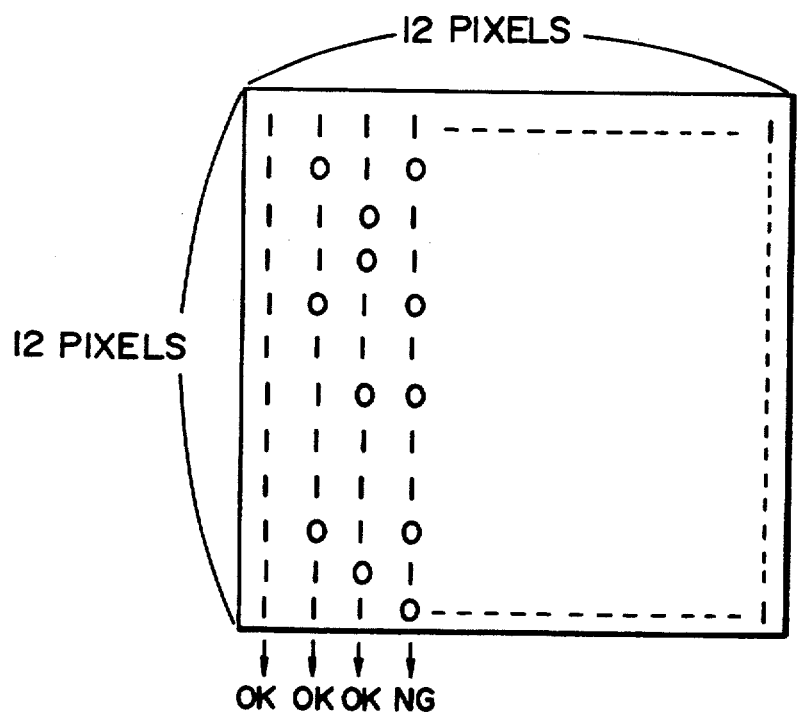

FIG. 6B indicates the operation of the second subscan mark detecting secion 40. Specifically, when the signal $f_8$ is "1" in any one of the twelve pixel blocks by a probability greater than a certain value (⅔ in this embodiment), the mark detecting section 40 determines that the block is "OK (="1")"; if the probability is smaller than the predetermined value, the secion 40 determines that the block "NG (="0")". After the twelve pixel blocks have been scanned, a second main scan mark detecting section 44 associated with the subscan mark detecting section 40 identifies the 12×12 pixel area as a mark area if the blocks are "OK" by a probability greater than a predetermined value (⅔ in this embodiment). Then, a second main scan mark detecting section 44 produces a signal $f_{10}$="1". If the first subscan and main scan detecting sections 38 and 42 have already detected a mark area, an AND gate 46 produces a signal $f_{11}$="1" because of the signal GATE which is "1". The signals $f_9$ and $f_{11}$ are fed to an OR gate 48 with the result that a signal $f_{12}$ showing whether or not the 12×12 pixel area of interest is a mark area appears on the output of the OR gate 48. If may occur that a mark has been divided by white, or that a small area of a mark is white or black. In order to detect such a mark as if it were a continuous mark, a main scan mark width expanding section 52 and a subscan mark expanding section 52 expand the 12×12 pixel area in the main and subscanning directions, respectively. A signal $f_{13}$ representative of a mark area finally appears on the output of the expanding section 52.

Figure 7:
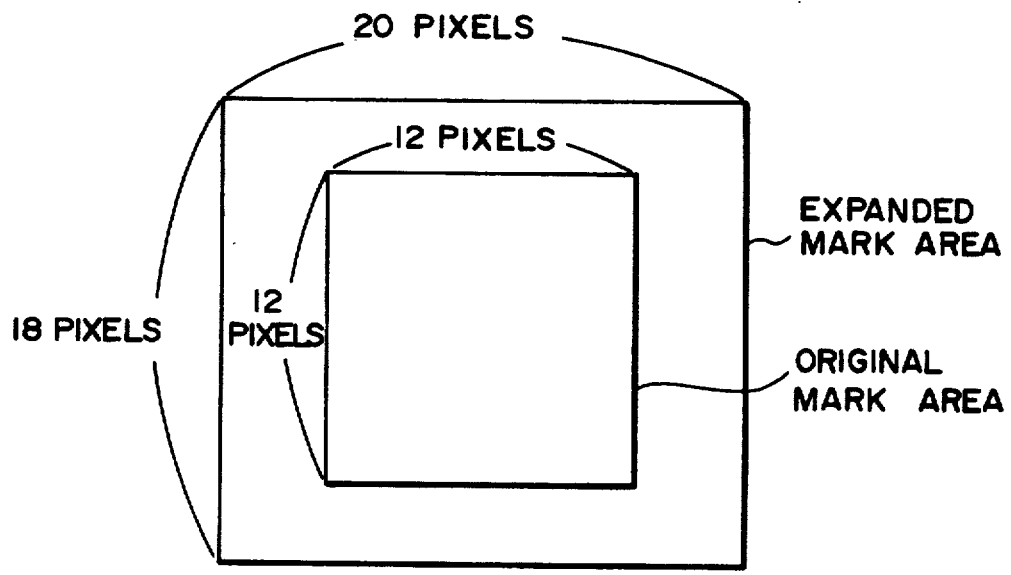
FIG. 7 illustrates the expansion of a mark area.

Specifically, as shown in FIG. 7, the illustrative embodiment expands the 12×12 pixel area by eight pixels in the main scanning direction and by six pixels in the subscanning direction. Again, the system may be modified to change the numbers of pixels by which the unit area is to be expanded. When a black printing is marked by a color felt pen, it will divide the mark because it has a high density. In such a case, the halftone area is extended to the black portion and detected. This kind of occurrence will hereinafter be referred to as division-by-black.

Figure 8:
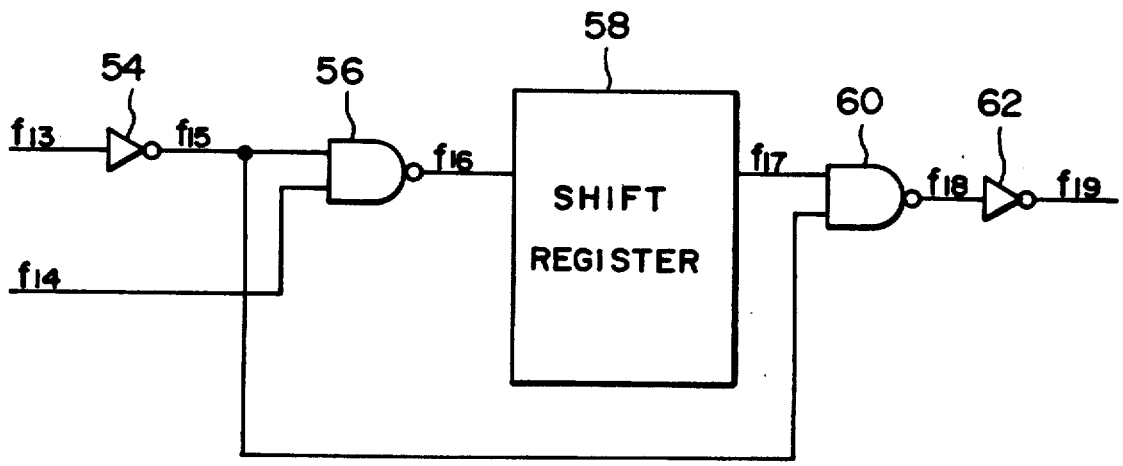
FIG. 8 is a block diagram schematically showing a circuit for coping with a mark which is divided by black.
Figure 9:
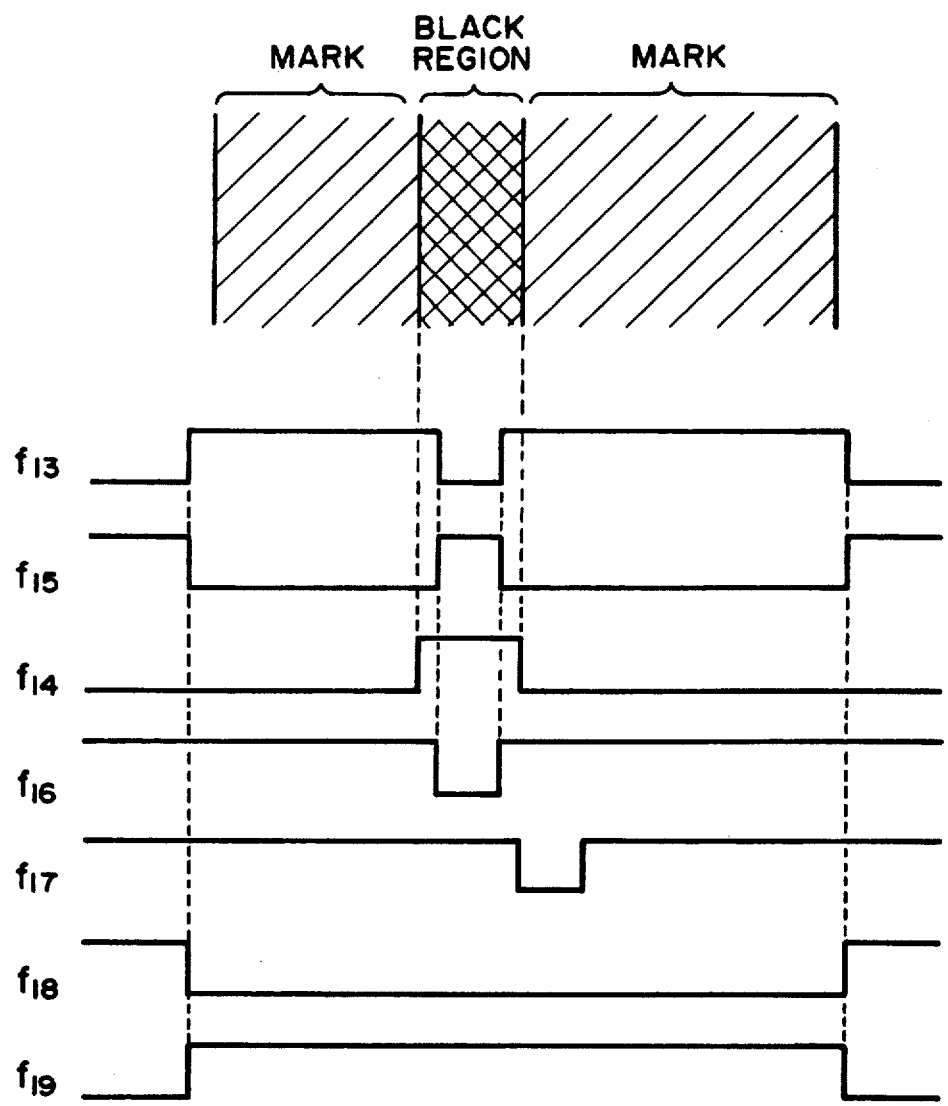
FIG. 9 shows a condition wherein a heavy black line trraverses a mark and signals associated therewith.

FIG. 8 shows a circuit used to eliminate the division-by-black mentioned above. FIG. 9 indicates a specific condition wherein a black line traverses and thereby divides a mark, the abscissa being representative of the main scanning directon. As shown in FIGS. 8 and 9, assume that a signal $f_{13}$ is representative of the mark having been expanded in the main and subscanning directions, and that a signal $f_{15}$ is an inverted signal of the signal $f_{13}$ produced by an inverter 54. A signal $f_{14}$ is associated with the black region and is "1" in the black region. The signals $f_{14}$ and $f_{15}$ are applied to a NAND gate 56 which then produces a signal $f_{16}$. A shift register 58 latches the signal $f_{16}$ and thereby outputs a signal $f_{17}$. In this particular embodiment, the shift register 58 latches the signal $f_{16}$ by sixteen pixels (about 1 millimeter). Hence, the division-by-black is compensated for in the main scanning direction by sixteen pixels plus previously expanded eight pixels, i.e., by twenty-four pixels (about 1.5 millimeters) and in the subscanning direction by sixteen pixels plus previously expanded six pixels, i.e., by twenty-two pixels (about 1.4 millimeter). Such specific values are also variable by modifying the system. The signals $f_{17}$ and $f_{15}$ are applied to a NAND gate 60 to achieve a signal $f_{18}$ which is free from division-by-black. The signal $f_{18}$ is delivered to an inverter 62 which then outputs a signal $f_{19}$ representative of the mark having been compensated for as to division-by-black.

How an area surrounded by a mark is detected will be described.

Figure 10:
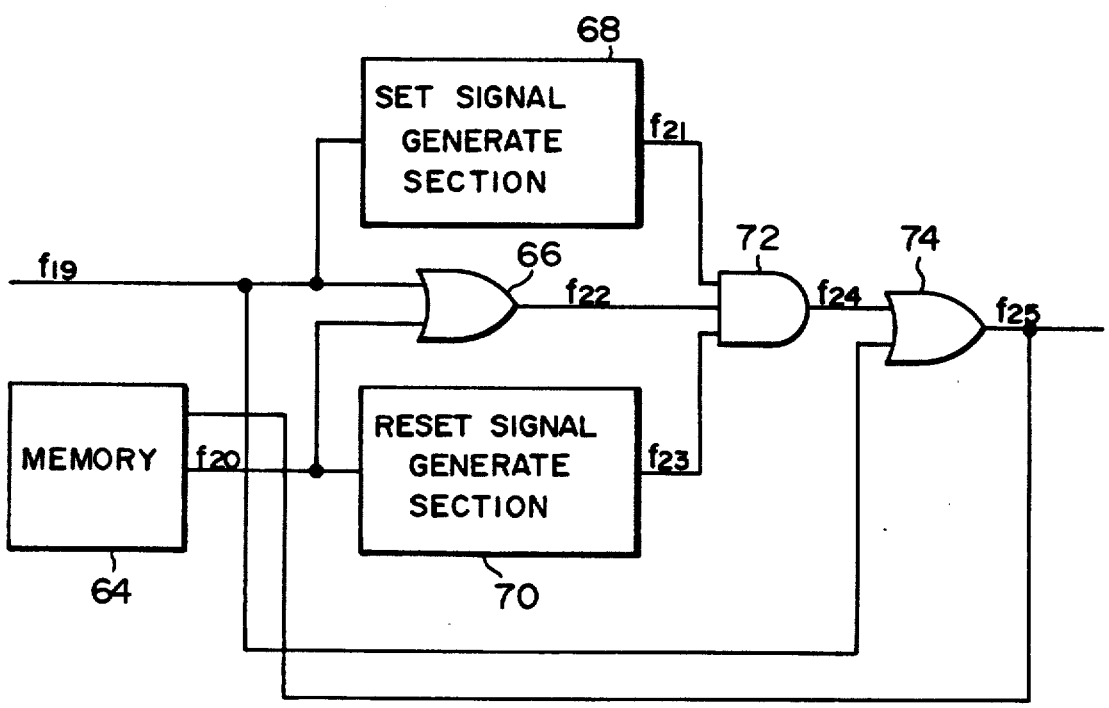
FIG. 10 is a block diagram schematically showing a mark area detecting section.
Figure 11:
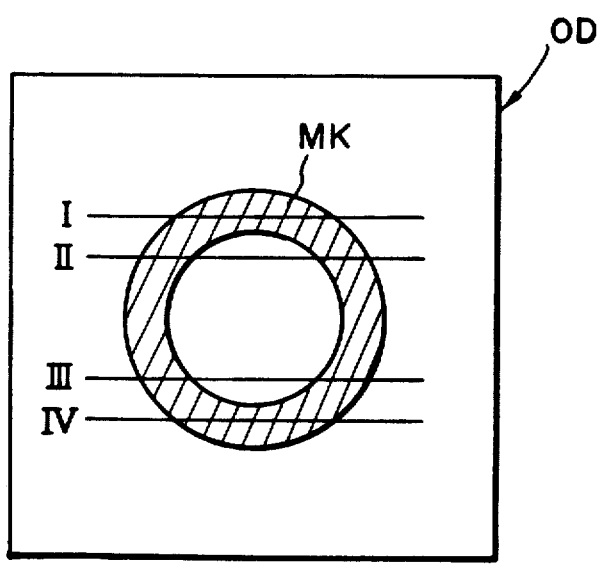
FIG. 11 is a view of a document on which a specific mark is written.
Figure 12:
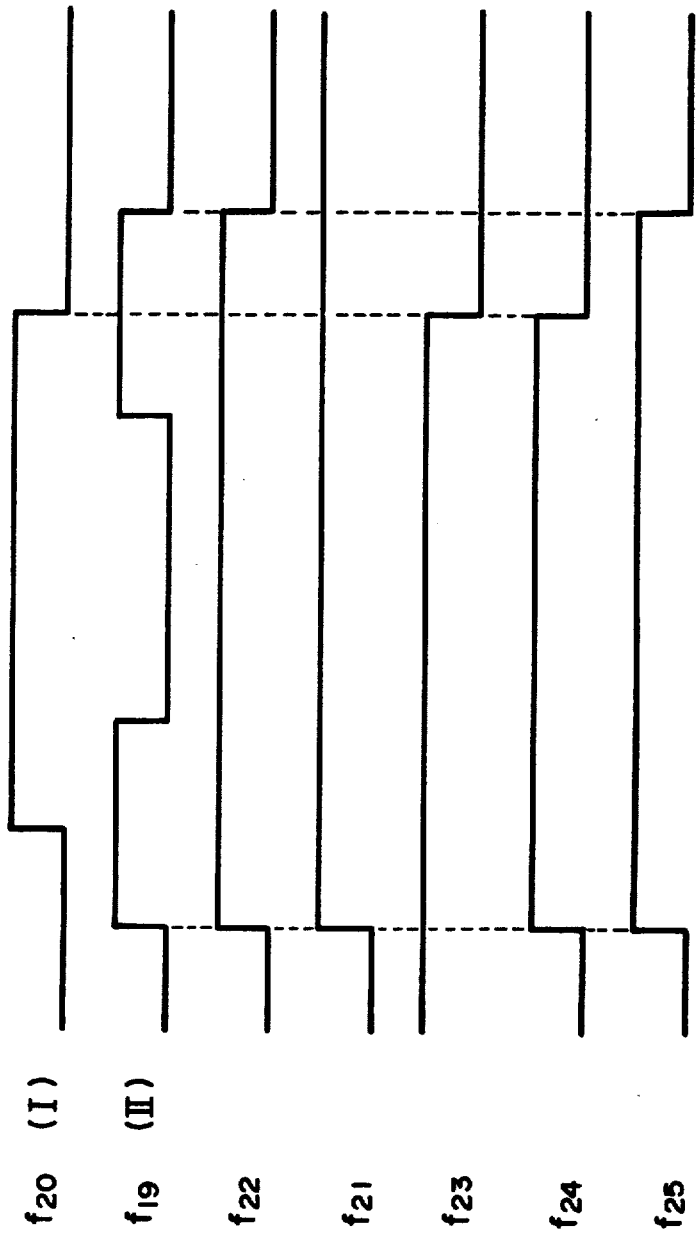
FIGS. 12 and 13 are timing charts representative of signals which are derived from the document of FIG. 11.
Figure 13:
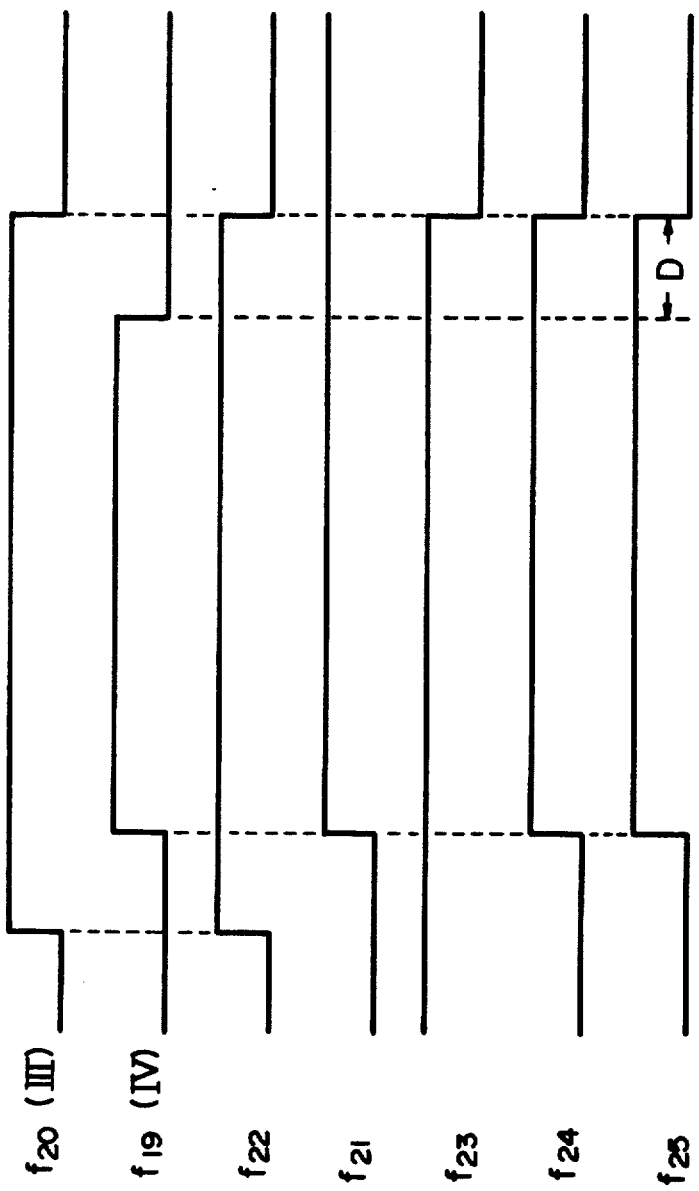

Referring to FIG. 10, a mark area detecting section is shown. FIG. 11 depicts an example of marks. FIGS. 12 and 13 are timing charts representative of signals which appear in the circuitry of FIG. 10. In FIGS. 12 and 13, I, II, III and IV indicate mark signals and mark area signals associated with points I to IV of FIG. 19. To detect the mark area at the point II, for example, the signal $f_{19}$ representative of the mark at the point II and a signal $f_{20}$ representative of the mark area at the point I and having been stored in a memory 64, FIG. 10, are applied to an OR gate 66 to produce a signal $f_{22}$. At the first positive-going edge of the signal $f_{19}$, a set signal generating section 68 shown in FIG. 10 generates a set signal $f_{21}$. At the negative-going edge of the signal $f_{20}$, a reset signal generating section 70 shown in FIG. 10 generates a reset signal $f_{23}$. The signals $f_{22}$, $f_{21}$ and $f_{23}$ are fed to a three-input AND gate 72, FIG. 10, to produce a signal $f_{24}$. The signals $f_{24}$ and $f_{19}$ are applied to an OR gate 74, FIG. 10, to produce a signal representative of a mark area. The mark area at the point IV is detected by a similar procedure and represented by a signal $f_{24}$. In this case, as shown in FIG. 13, the actual mark area signal is the same as the signal $f_{19}$ and, therefore, involves an error D. The error D does not matter at all because the distance between the points III and IV is a short as about 0.66 millimeter. The error D is ascribable to the fact that the set signal $f_{23}$ is set at the negative-going edge of the mark area signal $f_{20}$ associated with the previous line. While the error D will not occur if the reset signal is set at the negative-going edge of the mark signal $f_{19}$ coincident with the point where a mark area should be detected, e.g., point II, the above-described systemis adopted because the last negative-going edge cannot be readily determined such as when a plurality of marks exist together.

A relationship between the video data and the mark area detection signal will be described with reference to FIGS. 1 and 14. The image (video data b) outputted by the video processor 14 is applied to a mark area detecting section 76 which is included in the data processing control 1. The mark area detecting section 76 executes the previously stated mark area detecting procedure to thereby generate the mark area signal $f_{25}$. Because the mark area signal $f_{25}$ has been delayed in the main and subscanning directions, a video data delay circuit 78 matches the video data b to the mark area signal $f_{25}$ as to the delayed state. Specifically, the delay circuit 78 delays the video data b by a latch and a memory in the main scanning direction and the subscanning direction, respectively. In response to an input on an operation board, not shown, a CPU 80 delivers to a binarizing and editing circuit 82 a threshold level for binarization and data represenative of the trimming, masking, black-and-white inversion or similar processing associated with a mark area.

Figure 14:
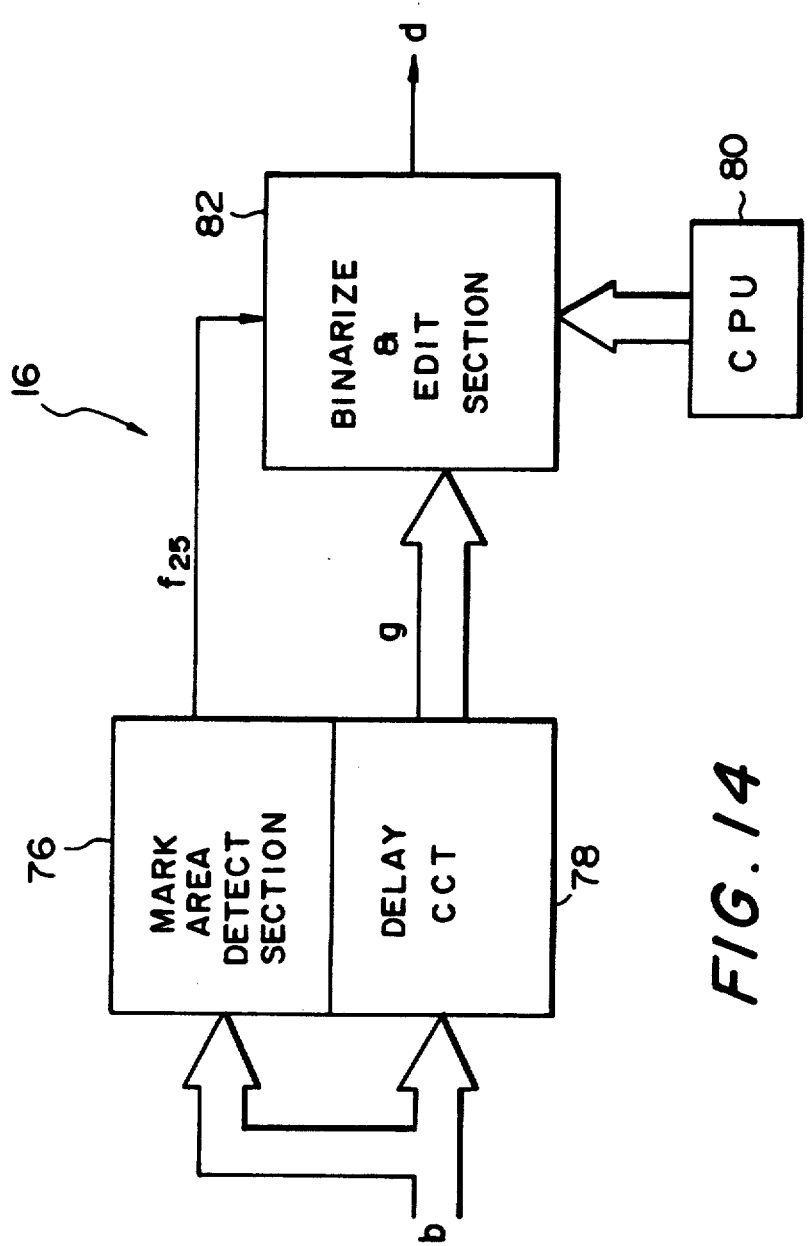
FIG. 14 is a schematic block diagram showing a relationship between video data and a mark area detection signal.
Figures 15A, 15B:
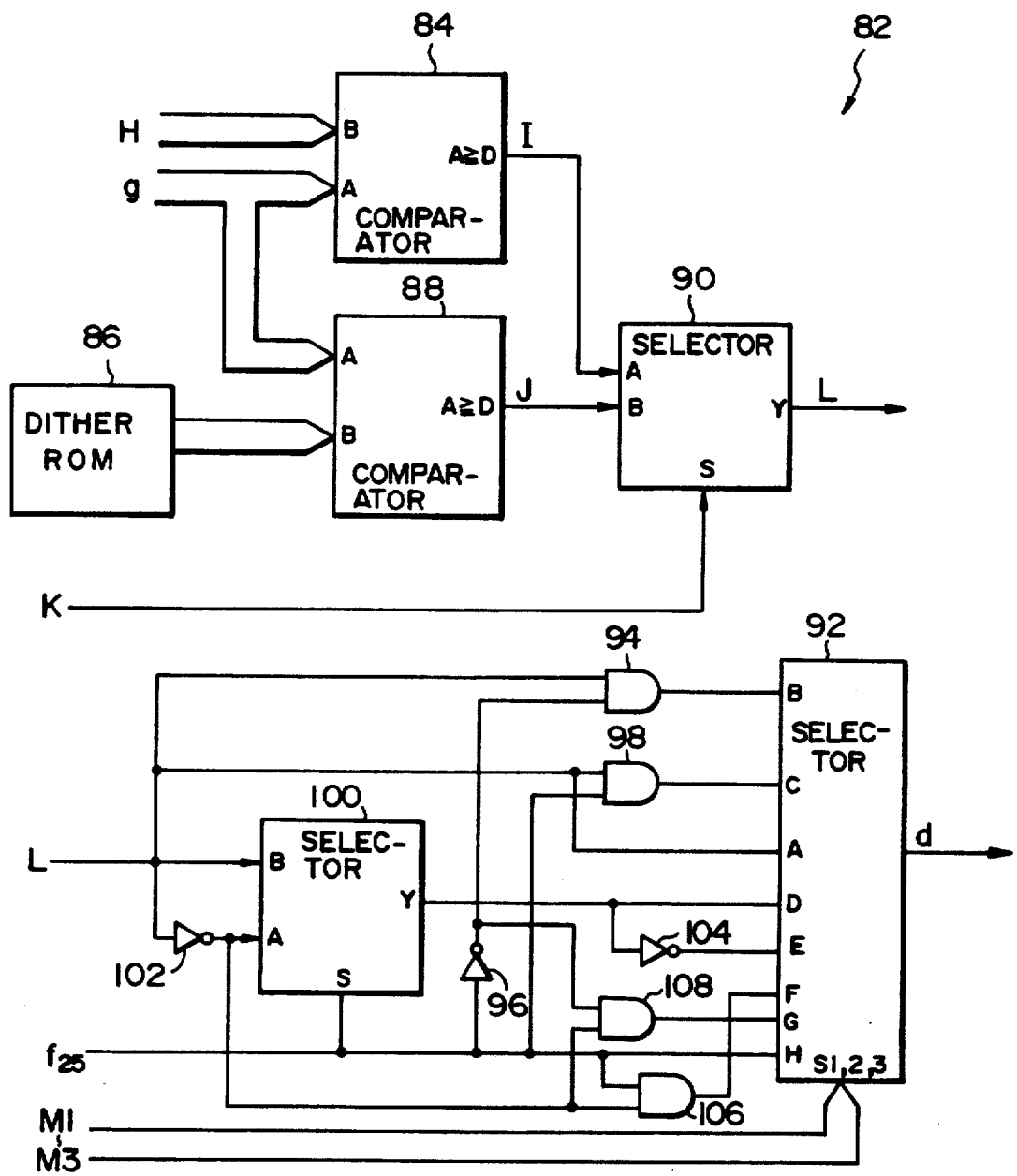
FIGS. 15A-B are schematic block diagrams showing a binarizing and editing circuit.

FIG. 15 shows the binarizing and editing circuit 82 of FIG. 14 in detail, while FIG. 16 shows a relationship of output data d to editing data K and M1 to M3 which may be delivered from the CPU 80.

To begin with, how the input data g is binarzed will be described. When the input data g is representative of a character, a comparator 84 compares a threshold level H fed from the CPU 80 with the input date g to produce a binary signal I. Another comparator 88 compares the input data g with a dither ROM 86 to produce dither data (halftone date) J. i.e., false halftone output. When a character mode has been selected on the operation board, the data K from the CPU 80 is "0" so that a selector 90 selects the binary signal I and produces it as its output L. When a halftone (picture) mode has been selected, the data from the CPU 80 is "1" and, hence, the selector 90 selects the dithere data J. At this instant, the data M1 to M3 from the CPU 80 which are associated with a selector 92 are "0" and, therefore, the signal L fed to an input A of the selector 92 is outputted.

The marker to be used in a marker editing mode has a density corresponding to halftone. Basically, therefore, an input document should be a text document having a definite black/write ratio, i.e., the document should have a background lower in density than the lower limit of the marker and characters higher in density than the upper limit of the marker. In practice, however, it is likely that document data lying in the range of marker density levels extends over more than the marker detecting block, such as when the document is a color document, document having a picture area, or document carrying then characters. The illustrative embodiment is free from such a drawback particular to marker detection, as will be described in detail later.

As stated above, the marker editing operation is intended for character documents and, hence, K is "0" in the marker editing mode. In response to the mark area signal $f_{25}$ which will be "1" or "H" when a marker area is detected, various kinds of processing are selectively executed, as follows.

(1) Masking: To erase information lying in a mark area. an AND gate 94 ANDs a signal produced by an inverter 96 by inverting the mark area signal $f_{25}$ and the binary video signal L. The resultant AND is fed to an input B of the selector 92. Command M1 from the CPU 80 is set to "1" while the commands M2 and M3 are set to "0", whereby masking data appears on the output d.

(2) Trimming: To extract only information lying in the mark area, an AND gate 98 produces AND of the mark area signal $f_{25}$ and the binary video signal L to pick up only the information existing in the mark area. The extracted information is fed to an input C of the selector 92. The command M2 from the CPU 80 is set to "1" while the commands M1 and M3 are set to "0" causing masking data to appear on the output d.

(3) Black-and-white inversion inside of mark area and video data outside of marker area: To invert black and white of, among video data, the information lying in a marker area while outputting video data for the outside of the marker area, a selector 100 selects either one of the video data and inverted data produced by an inverter 102 in response to the marker area signal $f_{25}$ which is applied to its select terminal S. Specifically, when a mark area signal is present, the selector 100 selects the inverted data. The commands M1 and M2 of the CPU 80 are "1" while the command M3 is "0".

(4) Black-and-white inversion outside of mark area and video data inside of marker area: The signal produced by the above processing (3) is inverted by an inverter 104. The commands M1 and M2 of the CPU 80 are "0" while the command M3 is "1".

(5) Black-and-white inversion inside of trimming marker; An AND gate 106 ANDS the mark signal and the inverted signal of video data in the same manner as in the processing (2). The commands M1 an M3 of the CPU 80 are "1" while the command M2 is "0".

(6) Black-and-white inversion outside of masking marker: AND gate 108 ANDs the inverted output of the inverter 96 and the inverted signal of video data. The command M1 of the CPU 80 is "0" while the commands M2 and M3 are "1".

(7) The mark area signal is produced as the output d by the commands M1, M2 and M3 of the CPU 80 all of which are "1".

By the various processing described above, the drawbacks particular to the marker detection are eliminated. The drawbacks are as follows.

(1) When an image exists at the same level as the density level where mark area is to be detected and, moreover, if such an image extends over more than the mark area detection block, erroneous detection occurs. This is especially true with a color document, photographic document, etc.

(2) Assume that document information is less than the mark area detecction block, but its density is the same as the mark density level. Then, the mark will be reproduced together with the document information. On the other hand, should the threshold level for binarizing characters be raised to prevent the mark from being reproduced, document image information would not be outputted.

(3) When the document is an original document which inhibits a mark from being written thereon or in order to eliminate the above drawback (2), the document may be copied so as to write a mark on the resultant copy. However, recopying a copy of an original document would degrade the image quality.

(4) When a heavy black line, for example, traverses a mark, accurate area detection is not achievable.

The illustrative embodiment eliminates the above drawbacks by selectively outputting information, mark area information, and mark-edited image information and applies them to the memory control section 18, FIG. 1.

The memory control section 18 will be described more specifically. The data processing control 16 implements the extraction, erasure, black-and-white inversion and other similar processing of information data lying in a mark area, as stated earlier. The data processing control 16 delivers to the memory control 18 three different signals:

(1) ordinary binary signal (inclusive of dither image);
(2) mark area signal; and
(3) mark-edited image.

While the three signals (1), (2) and (3) may fed to the memory control 18 either selectively or in parallel, this embodiment is constructed to select one of the signals (1), (2) and (3) depending on the document (mode). A memory for storing an image is divided into plurality of blocks which are controlled independently of each other. A specific configuration of the memory is shown in FIGS. 17 to 22 and is implemented by two memory blocks by way of example. Image memories 110 and 112 are capable of accommodating data associated with an area which the scanner 12 reads. For example, assuming a format A3 and a reading density of 400 dots per inch, a memory capacity of (297 millimeters÷25.4×400)×(420 millimeters÷25.4×400), i.e., nearly 4 megabytes is needed.

Figure 18:
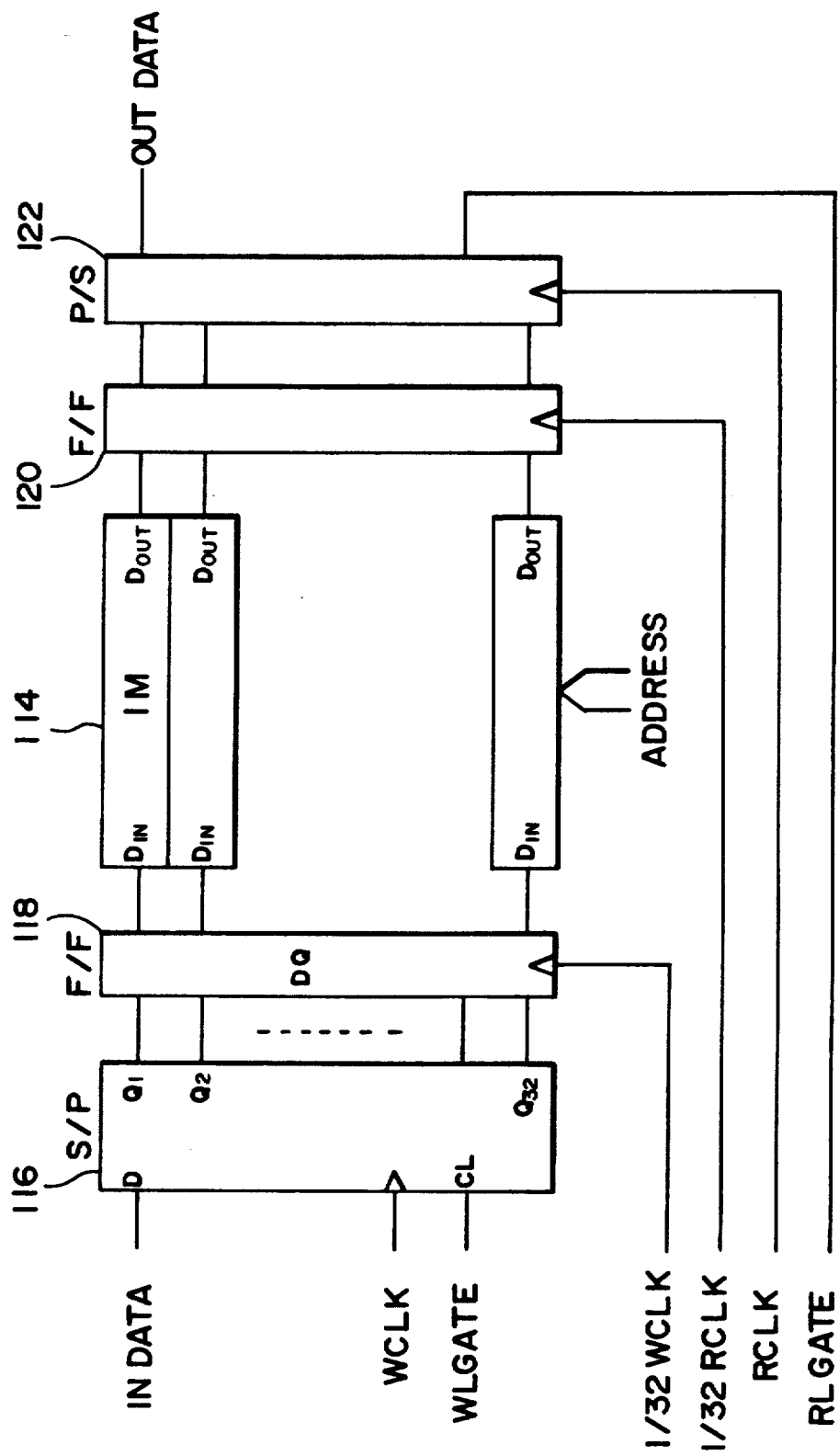
FIG. 18 is a block diagram schematically showing a specific construction of the image memories.

FIg. 18 indicates such a memory arrangement. As shown, the 4-megabyte memory is comprised of thirty-two 1MD-RAMs 114 which are arranged in parallel. Specifically, video data (IN DATA) is applied to a 32-bit serial-to-parallel converting section 116 and 118, and the resultant data are fed to the thirty-two memories (RAMs 114). For this purpose, a read clock RCLK and a write clock WCLK are individually divided in frequency by 32 to produce a signal 1/32RCLK and a signal 1/32WCLK, respectively. The signals 1/32RCLK and 1/32WCLK are synchronous with signals RLGATE and WLGATE, respectively. This allows the entire area of format A3 to be read, as stated earlier. The reference numerals 120 and 122 designate a parallel-to-serial converting section.

As shown in FIG. 17, address counters 124 and 126 are respectively associated with the memories 110 and 112 so as to control the addresses of the latter. The address counters 124 an 126 are each incremented by a clock signal which an associated AND gate 128 or 130 produces by ANDing the previously mentioned signal 1/32CLK (1/32WCLK in the case of writing or 1/32RCLK in the case of reading) and the signal LGATE (WLGATE in the case of writing RLGATE in the case of reading). The address counters 124 and 126 are each cleared by a signal FGATE (WFGATE in the case of writing or RFGATE in the case of reading). The signals CLK, LGATE and other similar signals have to be switched over in response to a read/write signal R/W. In FIG. 17, the reference numeral 130 designates an output control section.

Figure 19:
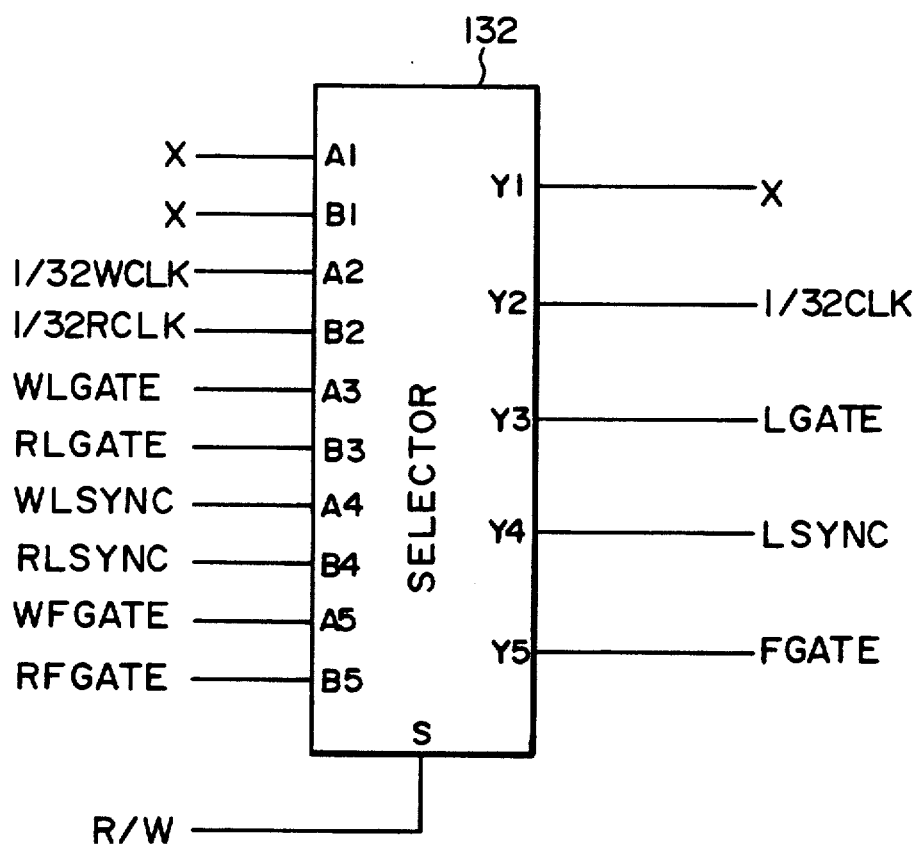
FIG. 19 shows various signals which are switched over by a read/write signal.

FIG. 19 shows the signals to be switched over by a selector 132 in response to a read/write signal R/W which is controlled by the CPU 80. The signal R/W determines whether data should be written to the memory or read thereoutof. Specifically, the signal R/W switches over the signals 1/32WCLK and 1/32RCLK, i.e., a signal produced by dividing by 32 the frequency of the clock WCLK synchronous to input image data and a signal produced by dividing by 32 the clock RCLK adapted to output video data to the laser printer 20. The selector 132 selectively outputs either one of the signals 1/32WCLK and 1/32RCLK as a signal 1/32CLK. Also switched over by the read/write signal R/W are a write signal WLSYNC and a read signal RLSYNC which are main scanning sync signals, a write signal WLGATE and a read signal RLGATE which are valid main scanning area signals, and a write signal WFGATE and a read signal RFGATE which are valid subscanning area signals.

Figure 20:
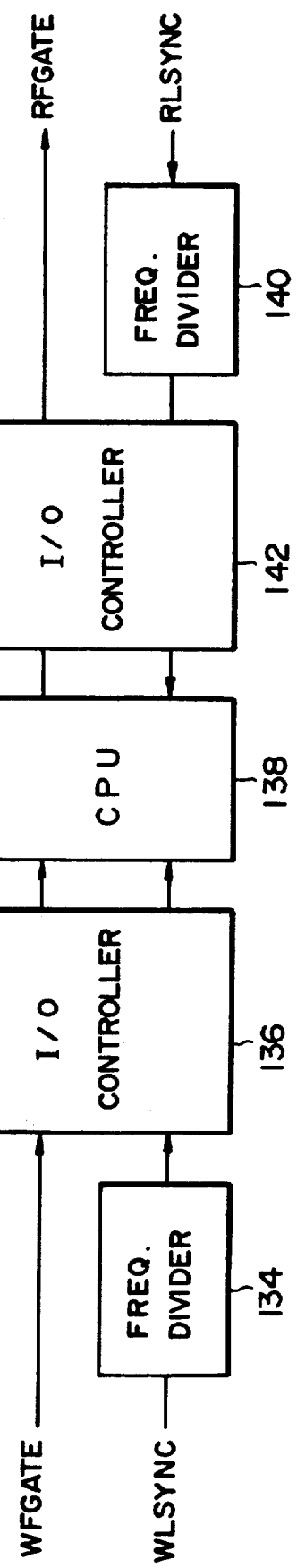
FIG. 20 is block diagram schematically showing a circuit for counting a valid subscanning area.

FIG. 20 shows an arrangement for counting a valid subscanning area. As shown, a frequency divider 134 divides the write signal WLSYNC by n and feeds its output to a CPU 138 via an input/output (I/O) controller 136. By counting the outputs of the frequency divider 134, the CPU 138 measures a subscanning length. In the event of reading, a frequency divider 140 divides the frequency of the read signal RLSYNC by n and delivers its output to the CPU 138 via an I/O controller 142. In response, the CPU 138 produces as the RFGATE the signal FGATE whose duration corresponds to WLSYNC of WFGATE. While a refreshing circuit is used in relation to the D-RAMs, it is implemented by conventional technology and, therefore, will not be described to avoid redundancy. If desired, D-RAMs may be replaced with S-RAMs.

Figure 21A:
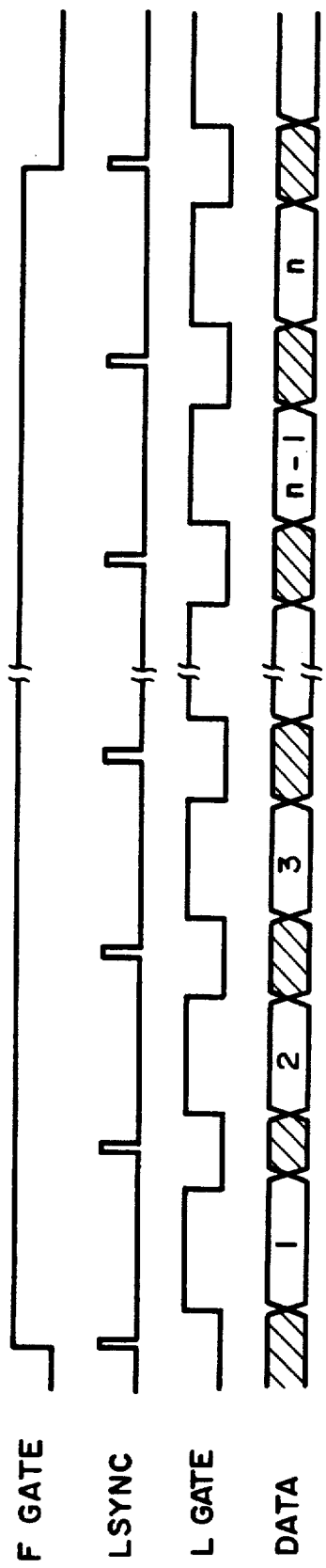
FIGS. 21A-B are timing charts showing signals appearing when a document is scanned in the main and subscanning directions.
Figure 21B:
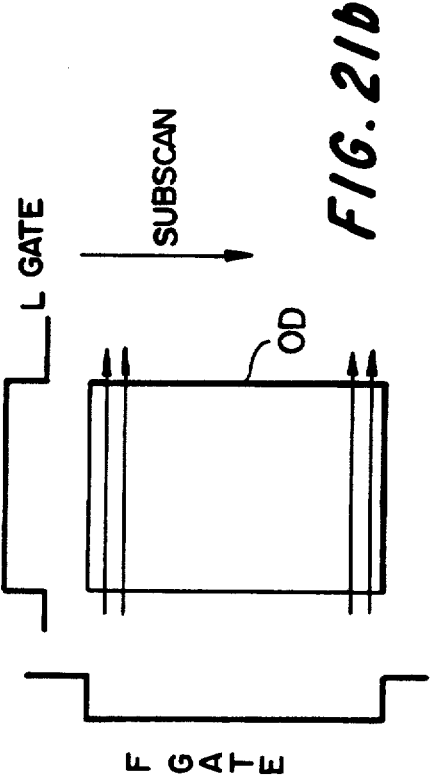

FIG. 21 is a timing chart showing a relationship of the signals to each other with respect to the main and subscanning directions. Assuming that the maximum format of a document OD is A3, data existing in the width A3 as measured in the main scanning direction are valid, i.e. FGATE. The duration of the signal FGATE may be associated with the maximum width of a document or, when the document OD is smaller than the maximum width, it may be selected on the basis of the document width or of a relationship between the document width and an image transferring width. In FIG. 21, it is to be noted that the signals FGATE, LSYNC and LGATE will be respectively WRGATE, WLSYNC and WLGATE in the event of writing or RFGATE, RLSYNC and LGATE in the event of reading.

Figure 22:
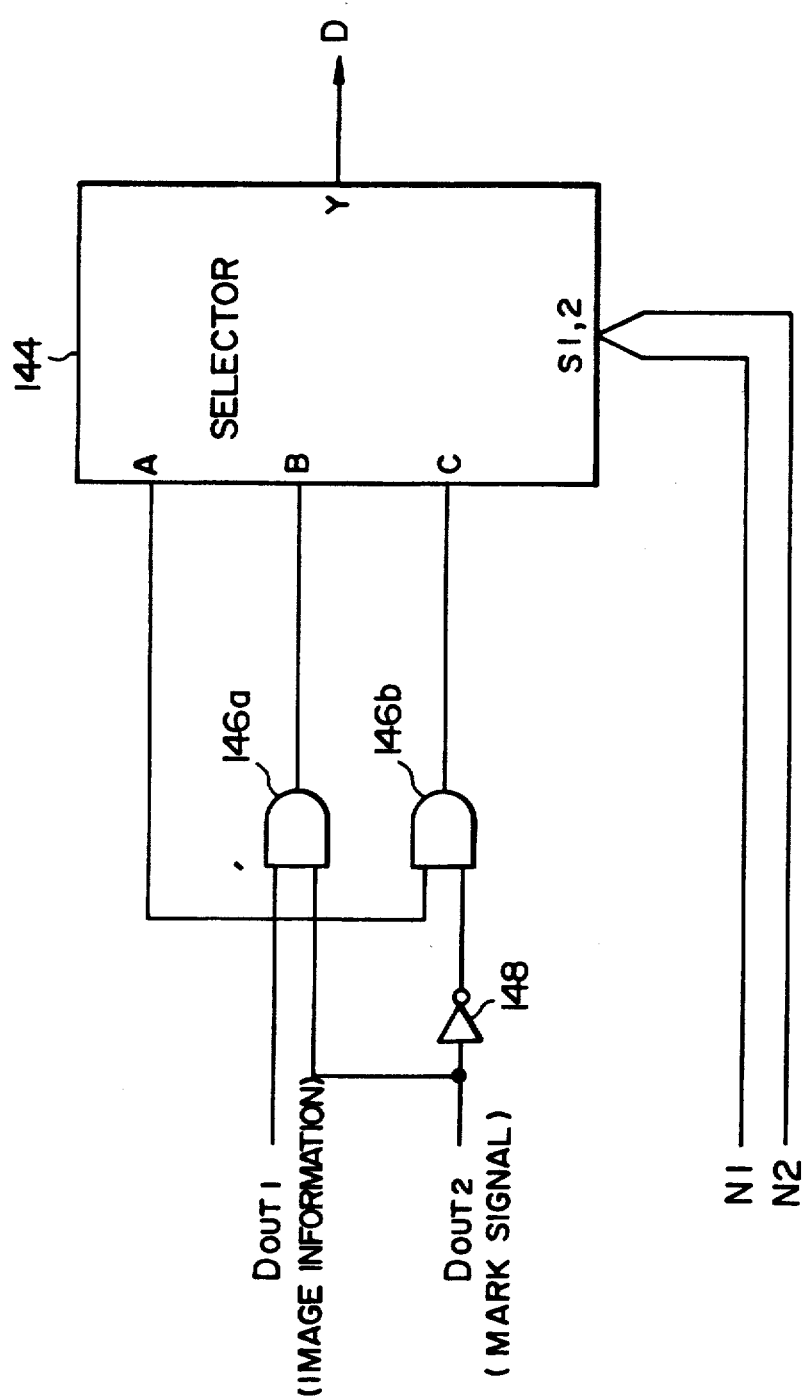
FIG. 22 is a block diagram schematically showing a combining circuit.

FIG. 22 indicates a combining circuit having a selector 144 to which signals N1 and N2 are fed from the CPU. The signals N1 and N2 are used to command a particular data editing mode. Specifically, when the signals N1 and N2 both are "0", video data are outputted. When the signals N1 and N2 are respectively "1" adn "0", an AND gate 146a produces AND of Dout₁ (image information) and Dout₂ (mark signal) with the result that only masking data for outputting only the marked area is fed out and printed out. Further, when the signals N1 and N2 are respectively "0" and "1", an AND gate 146b ANDs Dout₁ and inverted Dout₂ which is produced by an inverter 148 so as to output and print out masking data. While the combining circuit of FIG. 22 has been shown and described in relation to trimming and masking only, such a circuit is also successful in executing the other various processing modes such as the conversion of black and white as stated previously.

By combining data read out of the memories as stated above, a mark editing operation which is free from the drawbacks particular to a mark area is realized.

Figure 23:
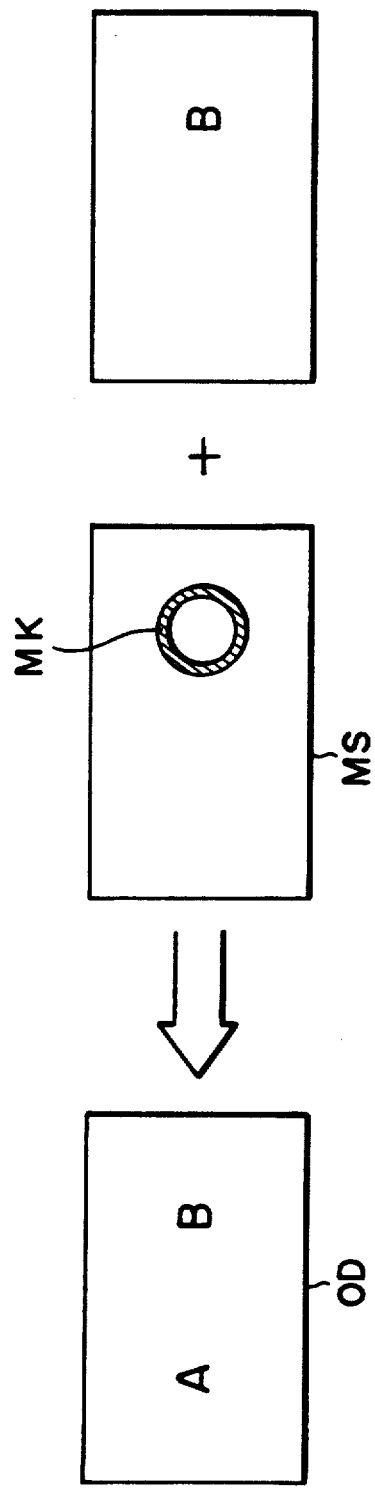
FIG. 23 illustrates a specific image editing procedure.

FIG. 23 shows a specific condition wherein an image on a document is trimmed by the illustrative embodiment. As shown, assume that letters A and B are printed on the document, and that a person desires to trim the letter B. Then, after the person has written a mark MK on a marking sheet or similar marking means MS, the docoument OD and the marking means MS are read and combined by the procedure shown and described. The resultant copy will have only the letter B thereon.

The operation of this embodiment will be described with reference to FIG. 24.

First, the operator sets marker mode combination on the operation board, now shown (step S1). In this condition, document information are fed to a first memory which is one of a plurality of means for storing document information. At this instant, a particular notch level is selected in matching relation to the density of the document (step S2). The operator is also capable of setting up or cancelling background removal (AE). The image information read at the selected notch level and AE level are written to the first memory (steps S3 and S4), but they are not outputted at thjis stage. On completion of the storage (YES, step S5), a marking sheet on which only a mark has been entered to specify a desired area of the document is read (steps S6 and S7). While reading means reads the marking sheet, only a mark area signal is picked up (step S8) and written to a second memory which is independent of the first memory (step S9). After the mark area signal has been stored in the second memory (YES, step S10), the image information and the mark area signal are read out of the first and second memories, respectively (step S11). Then, the combining circuit shown in FIG. 22 produces a desired edited image (steps S12 and S13). Alternatively, the mark signal and document information may be entered in this order, in which case the inputs Dout₁ and Dout₂ shown in FIG. 22 will be replaced with each other.

Figure 25:
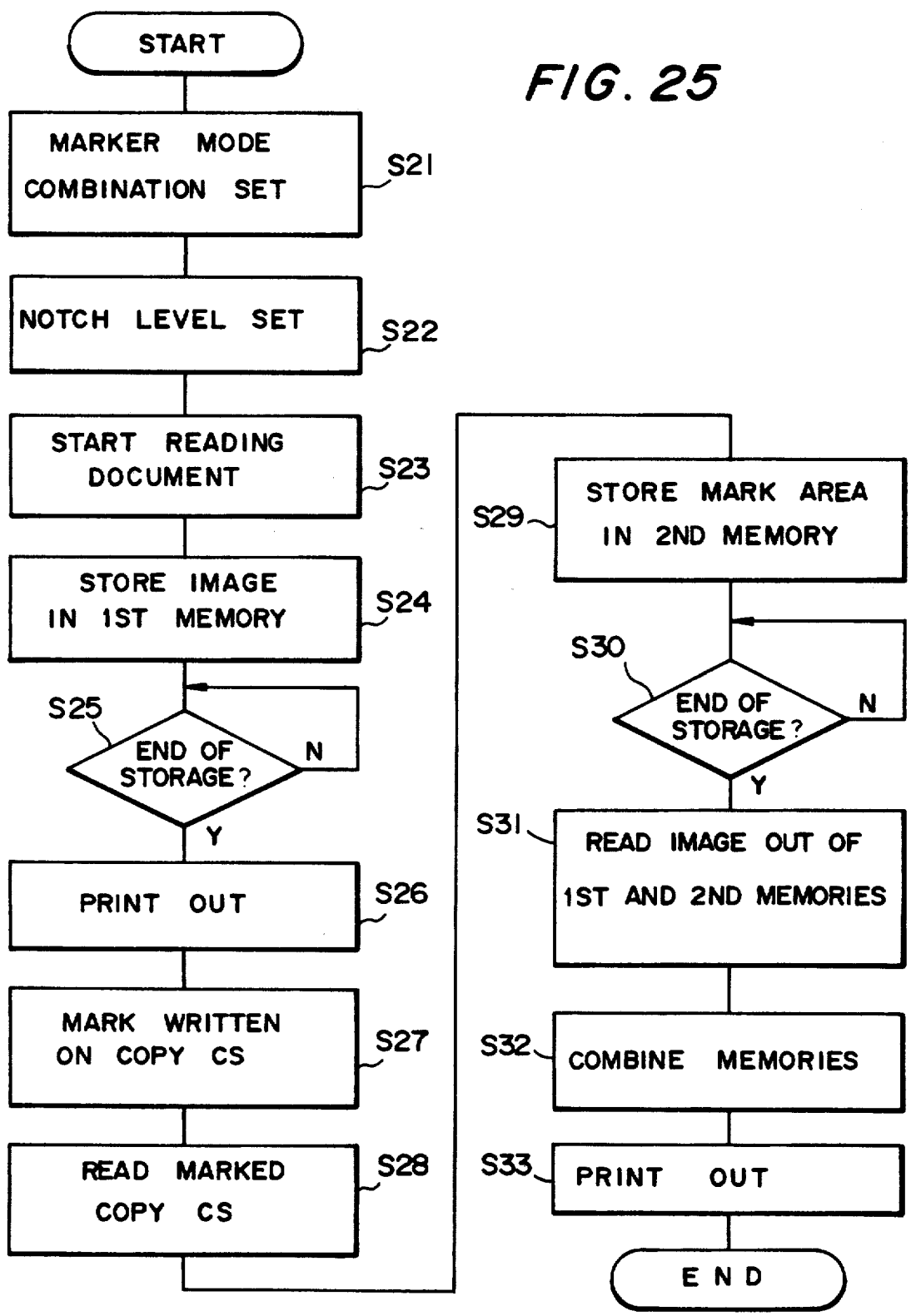
FIG. 25 is a flowchart indicating image editing control which is representative of a second embodiment of the present invention.

FIg. 25 is a flowchart representative of trim processing which is implemented by a second embodimetn of the present invention. Again, the operator sets marker mode combination on the operation board, not shown (step S21). In this conditon, document information are fed to a first memory which is one of a plurality of means forstoring document information. At this instant, a particular notch level is selected in matching relation to the density of the document (step S22). The operator is also capable of setting up or cancelling previously stated Ae (removal of background). The image information read at the selected notch level and AE level are written to the first memory (steps S23 and S24). On completion of the storage, the image information are read out of the first memory and printed out (steps S25 and S26). Since the document information, ie.e., the output of the laser printer has to levels. the density of the document information clearly appears on the resultant copy sheet CS. This, coupled with the fact that the marking sheete is a copy CS, allows a desired area to be specified easily and accurately by a mark (step S27). Subsequently, the coppy sheet CS with the mark is read (step S28). Only a mark are signal is picked up on the basis of the read information, and the document information is stored (step S29). After the storage, (YES, step S30), the image information and the mark are signal are respectively read out of the first and second memories (step S31) and then combined by the combining circuit (steps S32 and S33).

Figure 26:
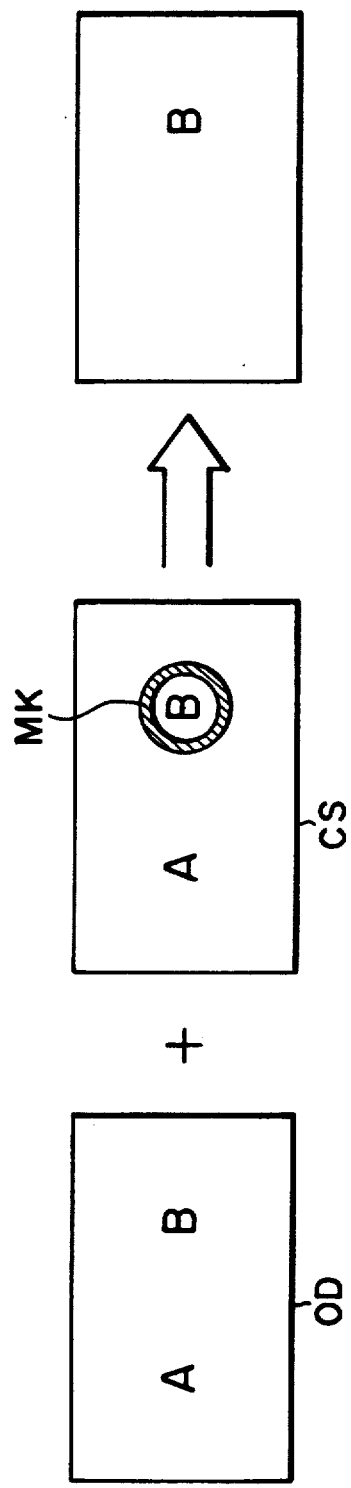
FIG. 26 shows a specific image editing procedure.

As shown in FIG. 26, the second embodiment is different from the first embodiment in that a mark is written on the copy sheet CS which is a reproduction of the document OD and, therefore, has both the letters A and B thereon in the same positions as on the docuiment OD. To trim the letter B, the operator will mark it on the copy sheet CS.

Figure 27:
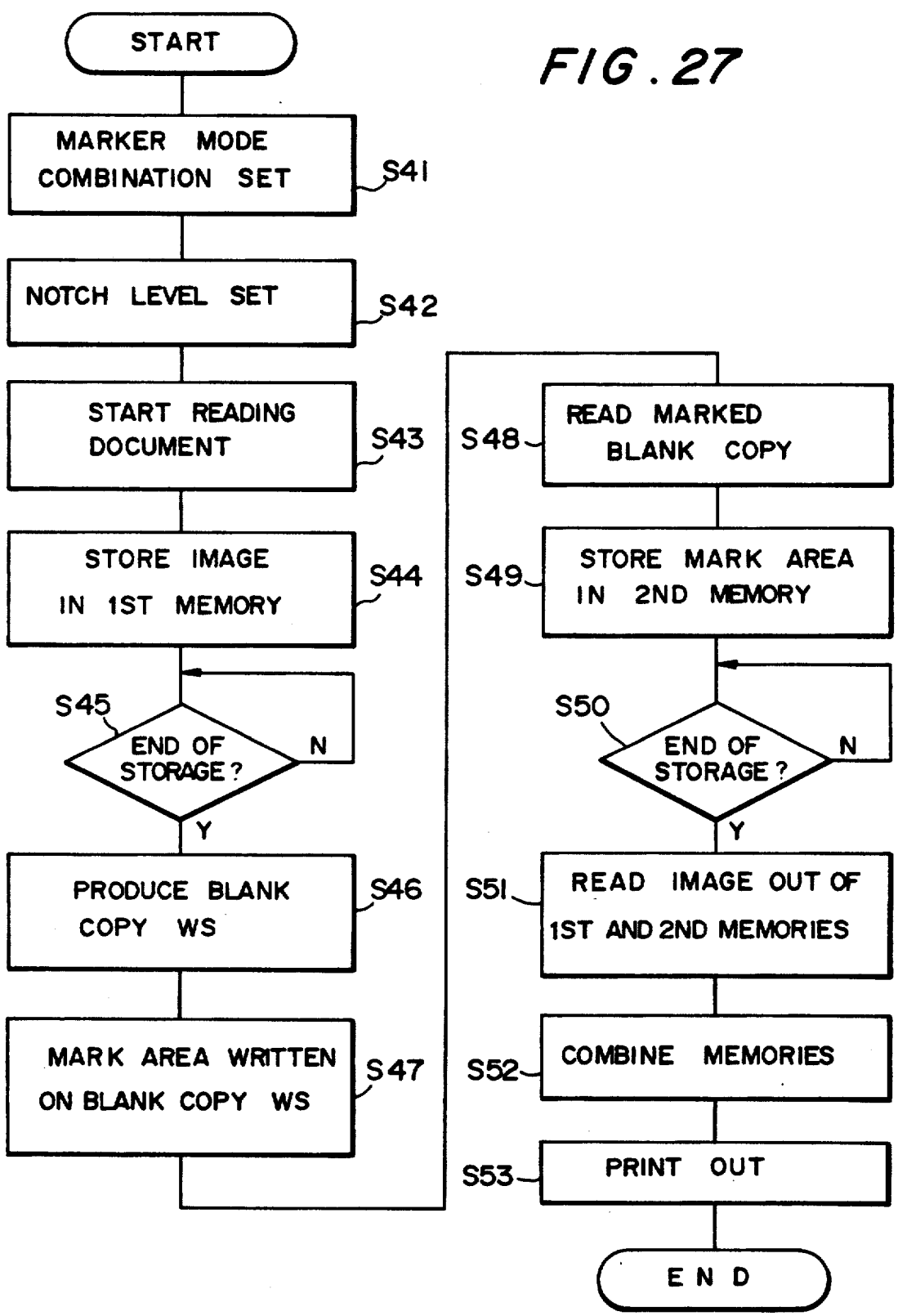
FIG. 27 is a flowchart showing specific image editing control representative of a third embodiment of the present invention.

Referring to FIG. 27, trim processing representative of a third embodiment of the present invention will be described. As shown, the operator manipulates the operation board, not shown, to set marker mode combination (step S41). In this condition, document information is written to a first memory which is one of a plurality of means for storing document information. At this instant, a particular notch level is selected in matching relation to the density of the document information (step S42). The operator is also capable of setting or cancelling AE (removal of background), as desired. The image information read at the selected notch level and AE leve is written to the first memory (step S43 and S44).

While the document is read, its size is also detected. A blank copy whicyh will be described is discharged in matching relation to the detected document size to facilitate the entry of a mark. The size of the blank copy need only be greater than a size covering a desired are (mark area).

Figure 28:
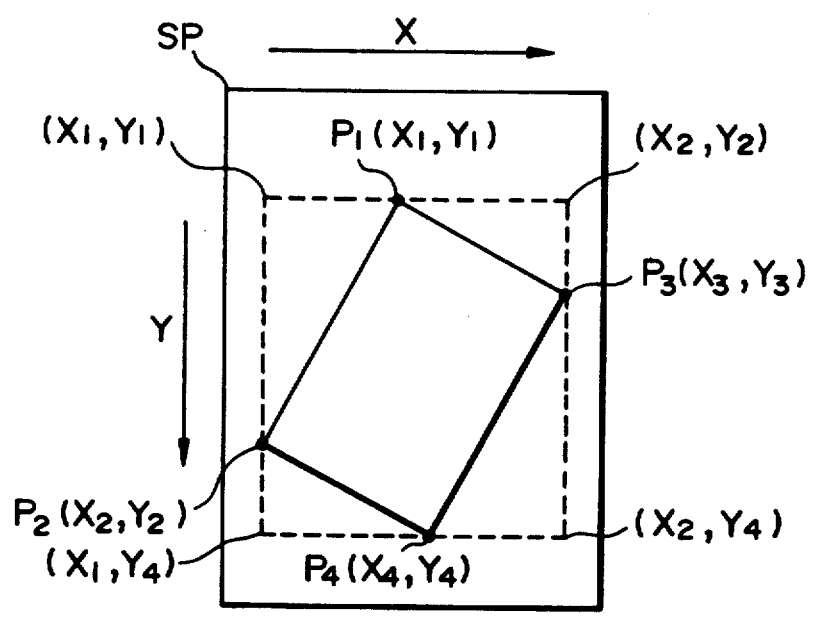
FIG. 28 shows how a document size is detected.

FIG. 28 shows a glass platen 12c associated with the scanner 152 and on which the document OD is laid. The document OD may be located in an oblique positon as illustrated, although its position is basically predetermined. Assume that the glass platen 12c has reference condinates SP, and that the main and subscanning directions are respectively X and Y as viewed from the reference coordinates SP. Then, the coordinates of four points $P_1(X_1, Y_1)$, $P_2(X_2, Y_2)$, $P_3(X_3, Y_3)$ and $P_4(X_4, Y_4)$ are detected by causing the scanner to prescan the document OD, whereby the size and position of the document OD is determined. This allows a scanner scanning stroke to be determined in a multi-copy mode and allows a desired paper cassette to be selected. A cop cover, for example, is mirror-finished so that all the image information outside of the area which the document OD assumes may turn into black data. Main and subscannins are executed such that the subscanning scans the entire surface of the glass platen 12c. At this time, the subscanning speed is higher than the subscanning speed assigned to actual printing operations. This is followed by scanning for print-out.

Figure 29:
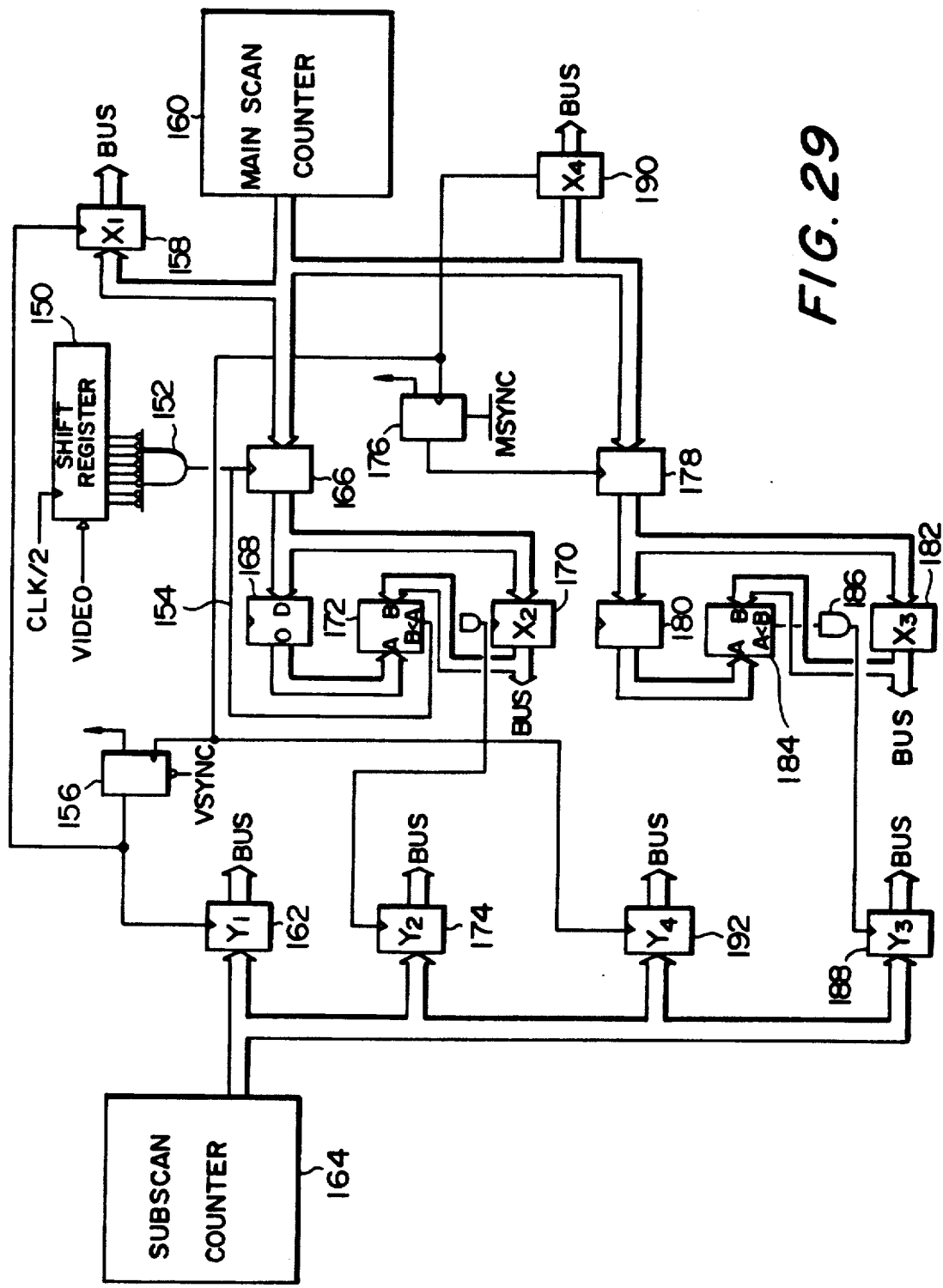
FIG. 29 is a block diagram schematically showing a document size detecting circuit.

FIG. 29 schematically shows a logic circuit for detecting the coordinates as states above. Binary video data VIDEO produced by prescanning are fed, eight bits at a time, to a shift register 150. As soon as eight bit of video data VIDEO have been lodged in the shift register 150, a gate 152 determines whether or not all the eight bits of data are representative of a white image and, if the answer is positive, it outputs "0" to a signal line 154. A flip-flop 156 is set when a string of eight bits representative of white appears for the first time after the start of prescanning. The flip-flop 156 has been reset by a signal VSYNC (image lead edge signal ) beforehand. Once the flip-flop 156 is set as mentioned above, it remains set until the next signal VSYNC appears. When the flip-flop 156 is set, the instantaneous vavlue of a main scan counter 160 is loaded in a latch flip-flop 158 and is the $X_1$ coordinate. At the same time, the instantaneous value of a subscan counter 164 is loaded in a latch 162 and is the $Y_1$ coordinate. Hence, the coordinates $P_1$ ($X_1$, $Y_1$) is determined.

Every time "1" appears on the signal line 154, a value associated with the main scanning is lodged in a latch 166. This value is memorized by a latch 168 immediately, i.e., before the next eight bits arrive at the shift register 150. When the value associated with main scanning which holds on the appearance of the first eight bits of white is loaded in the latch 168, a comparator 172 compares it with data having been stored in a latch 170 (which is set to "0" by VSYNC). If the data of the latch 168 is greater than that of the latch 170, the former, i.e., the data of the latch 166 is loaded in the latch 170. At the same time, the instantaneous value of the subscan counter 164 is lodges in a latch 174. Such steps are completed before the next eight bits arrive at the shift register 150. By so comparing the latches 168 and 170 and updating the latch 170 over the entire image area, the maximum value in the X direction is left in the latch 170 and the associated coordinate in the Y direction is left in the latch 174. This is the coordinates $P_2$ ($X_2$, $Y_2$).

A flip-flip 176 is set when eight bits of white appear for the first time on each main scanning line. The flip-flop 176 is reset by a horizontal sync signal HSYNC and, once set as mentioned above, remains set until the next signal HSYNC arrives. At the intant when the flip-flop 176 is set, the value of the main scan counter 160 is set in a latch 178 and, before the arrival of the next signal HSYNC, loaded in a latch 180. A comparator 184 compares the latch 180 with a latch 182 in which the maximum value in the X direction has been stored in response to signal VSYNC. If the value of the latch 182 is greater than that of the latch 180, a signal line 178 becomes active with the result that the data of the latch 180, i.e., the latch 178 is loaded in the latch 182. Such steps are completed during the interval between the signal HSYNC and the signal HSYNC. Such comparing and and updating operations are repeated over the entire image area to leave the minimum value in the X direction in the latch 182 , and the is value is the coordinate $X_3$. When the signal line 186 becomes active, a value associated with subscanning is loaded in a latch 188 as the coordinate Y.

Latches 190 and 192 are respectively loaded with the values of the main scan counter 160 and subscan counter 164 every time eight bits of white appear in the entire image area. Hence, at the end of prescanning, the counts of the instant when eight bits of white have appeared last are left in the counters 160 and 164 and indicate the coordinates ($X_4$, $Y_4$).

Data lines associated with the above-described eight latches are interconnected to a bus line BUS of a CPU, not shown. The CPU, therefore, read the coordinates data when the prescanning is completed and determines that, among the data, the data $X_2$, $X_3$, $Y_1$ and $Y_4$ define a document area. Then, the trim processing described previously is executed while the document is scanned for actual print-out. Specifically, the coordinates components $X_2$, $X_3$, $Y_1$ and $Y_4$ indicate the coordinates of a rectangle which surrounds the document positions $P_1$ to $P_4$. All that is required is, therefore, feeding a paper sheet whose size is equal to or greater than the rectangle from a paper cassette and discharging it as a blank copy. The construction and arrangement of a paper cassette and its associated mechanism are well known in the art, and redundant description will be avoided for simplicity.

Referring again to FIG. 27, when the data is fully written to the first memory in the step S45, a blank copy WS matching the size of the rectangle as stated above is produced (step S46). Then, the operator lays the blank copy WS on the document OD and marks a desired area of the document OD on the blank copy WS (step S47). The blank copy WS with the mark is read (step S48). Based on the read information, only a mark area signal is picked up to store the mark area (step S49). On completion of the storage (YES, step S50), the image information and the mark area signal are respectively read out of the first and second memories (step S51) and then combined by the combining circuit to produce a desired edited image.

Figure 30:
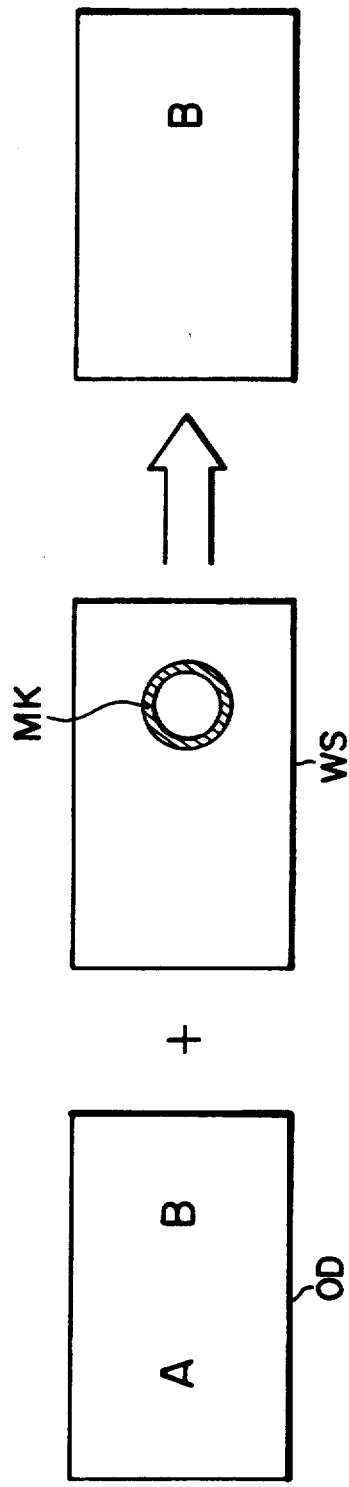
FIG. 30 shows a specific image editing procedure.

FIG. 30 shows a trimming procedure associated with the flowchart of FIG. 27. The procedure of FIG. 30 is different from the procedure of FIG. 26 in that the paper sheet for marking a desired area is implemented as a blank copy WS. The blank copy WS is laid on the document OD, and then an area of the former overlying the letter F of the latter is marked.

The rest of the construction of the second and third embodiments which are not shown or described is the same as the first embodiment.

The illustrative embodiments shown and described have various unprecendented advantages, as enumerated below.

(1) After image information of a document and a marked area of the document are written to storing means, and then the marked area and the image information are combined (extraction, erasure, black-and-white inversion as to the image lying in the marked area). Stated another way, it is not necessary for a person to mark a document. This, coupled with the fact combining only the document information and the marked area, i.e. a single generation suffices, enhances the quality of reproductions.

(2) Even document information whose density is low can be combined and reproduced without being lost.

(3) A mark itself does not appear on reproductions.

(4) Marking a paper sheet other than a document eliminates wasteful copies, compared to copying document information and then marking the resultant copy.

(5) Division of a mark heretofore encountered when a mark is entered on a copy of a document (e.g. when a mark has to be written across a heavy line) is precluded, thereby freeing mark detection from errors.

(6) Even a color document or a picture area of a document can be edited by using a mark.

(7) Image information of a document is written to storing means and, at the same time, printed out, the resultant copy is marked, and then the marked area and the image information are combined. This is successful in promoting accurate marking. More specifically, the document information is transformed into copy information, allowing a desired area to be marked as accurately as on a document.

(8) The procedure shown in FIG. 26 eliminates erroneous mark detection because a mark will not have the same density as a black image of a binary reproduction.

(9) In the third embodiment, a blank copy having a greater size than a size which includes a desired area is produced, and the desired area is marked on the blank copy. Control means writes a desired area signal read out by reading means to one of a plurality of storing means which is different from the storing means having stored the image information, whereby the image of the document and the images lying inside and outside the desired area are discriminated from each other. This prevents a mark from being divided on a copy of a document (such as when a mark has to be written across a heavy black line) and thereby eliminates errors in mark detection.

(10) The third embodiment discharges a paper sheet in the form of a blank copy and thereby eliminates the need for an extra marking sheet, enhancing efficient manipulations.

A fourth embodiment of the present invention will be described which executes different image processing by using the combining circuit of FIG. 22. First, assume that mark editing is to be executed by a data processing section without resorting to the combination which uses memories, i.e., the time and labor particular to the combination mode (necessary for reading an image twice) or a wasteful copy is not desired or a document is of the kind allowing a mark to be written directly therein (e.g. copy). Then, marker editing may be executed without the intermediary of the combination by memories, i.e., the edited image from $Dout_1$ will be outputted via the selector 144.

Second, assume that a document is of the kind inhibiting a mark from being written thereon or includes halftone, or that a mark has to surround a heavy black line. Then, after the document has been read, a paper sheet other than the document and having been marked is read. In the case of trimming, the image information from $Dout_1$ and the mark area signal from $Dout_2$ are ANDed by the AND gate 146a while, in the case of masking, the inverted signal of the mark area signal produced by the inverter 148 and the image information are ANDed by the AND gate 146b. The resultant outputs of the AND gate 146a 146b are selectively outputted via the selector 144.

Third, when the a desired area of a document of a document has a complicated configuration and needs accurate positioning, the document is copied and the resultant copy is marked. This is followed by the same procedure as just described above.

Figure 31:
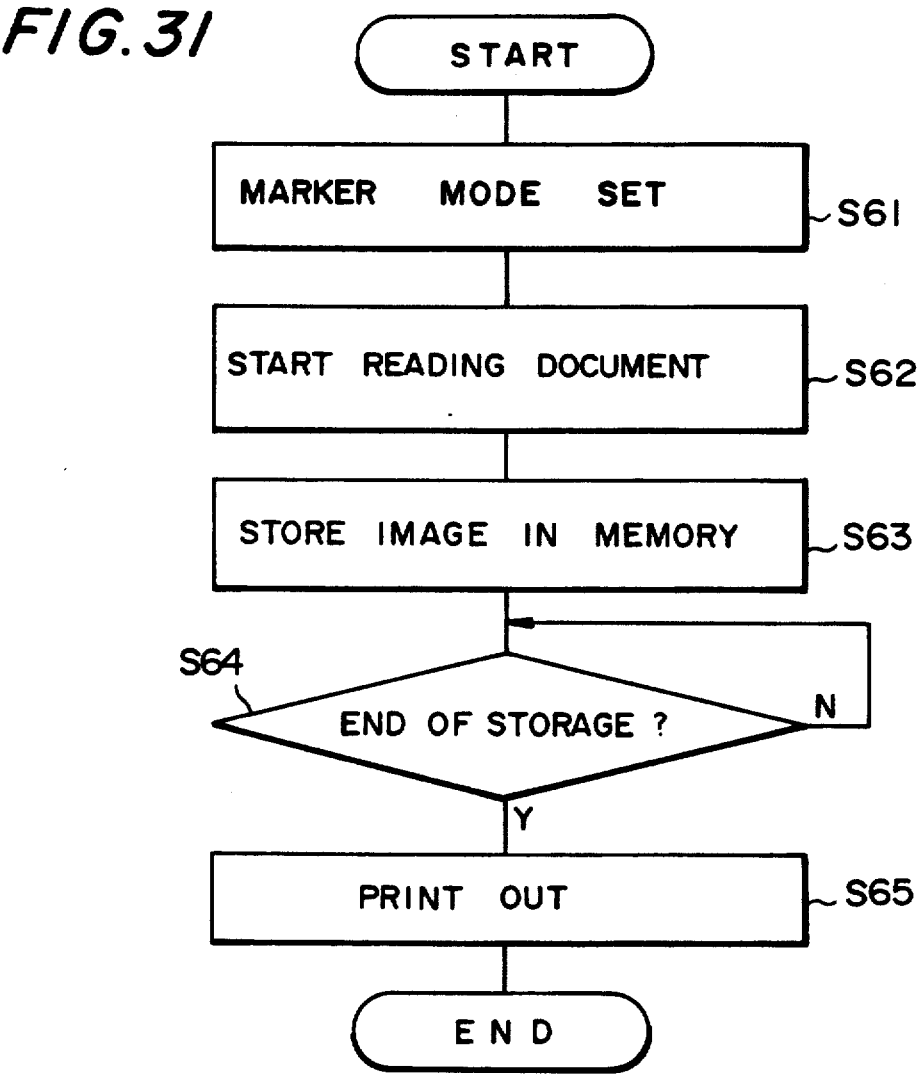
FIG. 31 is a flowchart demonstrating a specific image editing control representative of a fourth embodiment of the present invention.
Figure 32:
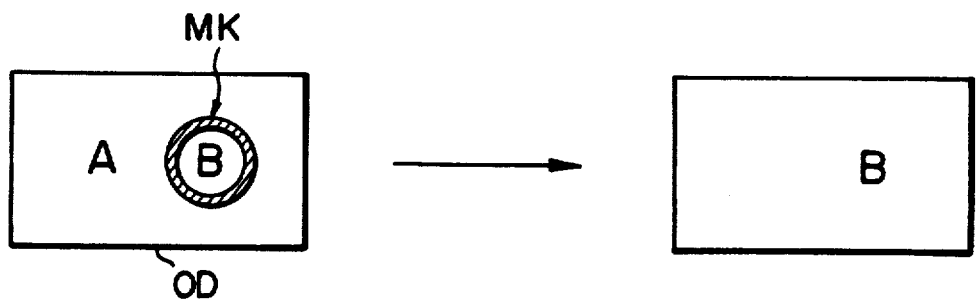
FIG. 32 shows a specific image editing procedure.

Specifically, FIG. 31 is a flowchart demonstrating the procedure for executing mark editing at the data processing section without resorting to memories. The procedure begins with a step S61 in which the operator selects an exclusive mode 1 for this procedure on an operation board, not shown. Then, a document is marked to specify a desired area and then read by the scanner 12 (step S62). The output signal of the scanner 12 is edited to write the resultant image to a memory (step S63). On completion of the storage (YES, step S64), the edited image is printed out (step S65). Such a procedure will be better understand with reference to FIG. 32 which is representative of a trimming mode. As shown, a mark MK is entered on a document OD to surround the letter B, whereby the letter B is printed out. More specifically, in FIG. 22, the edited image fed from $Dout_1$ to the terminal A of the selector 144 and, when the data N1 and N2 of the CPU both are "0", printed out.

Figure 33:
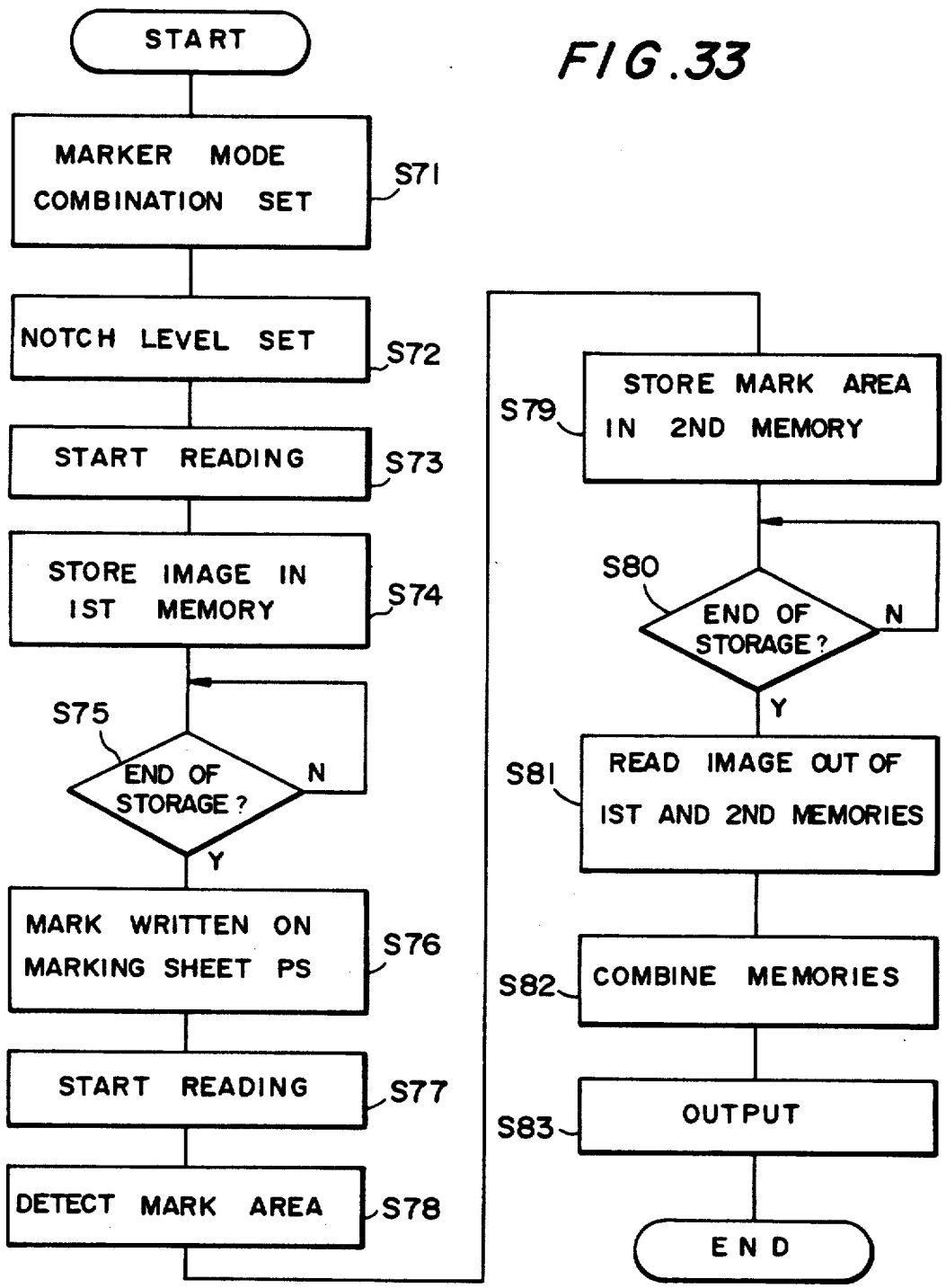
FIG. 33 is a flowchart showing another specific image editing control.
Figure 34:
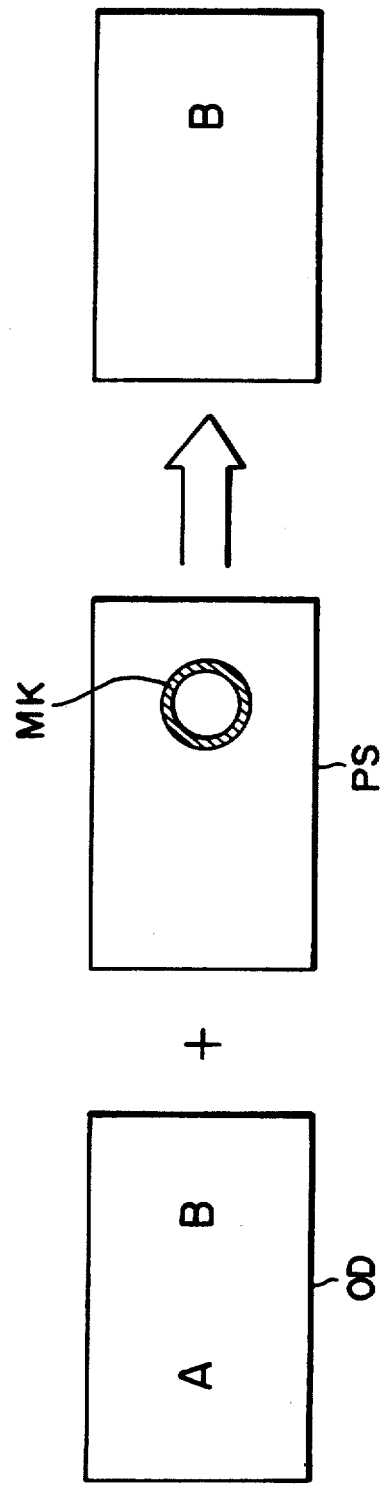
FIG. 34 illustrates a procedure associated with the flowchart of FIG. 33.

FIG. 33 shows a sequence of steps for executing mark editing by using memories. As shown, the operator selects an exclusive mode 2 on the operation board, not shown, (step S71). In this condition, document information is fed to a first memory of a plurality of memories for storing document information. At this instant, a particular notch level matching the density of the document information is selected (step S72). The operator is also capable of setting or cancelling AE (removal of background), as desired. The image information read at the selected notch level and AE level is written to the first memory (steps S73 and S74), but it is not printed out at this stage. On completion of storage (YES, step S75), a paper sheet PS on which only a mark area has been written is read (steps S76 and S77). Of course, the paper sheet PS is marked in the same position as the desired area of the document. The scanner 12 reads the marked paper sheet PS (e.g. blank copy) to produce a mark area signal only (step S78). The mark area signal is written to a secondary memory which is independent of the first memory (step S79). On completion of the storage (YES, step S80), the image information and the mark area signal are respectively read out of the first and second memories (step S81) and then combined by the combining circuit to produce a desired image (steps S72 and S73). Alternatively, the mark signal and the document information may be entered in this order. FIG. 34 shows a trimming mode which may be implemented by the procedure of FIG. 33.

Figure 35:
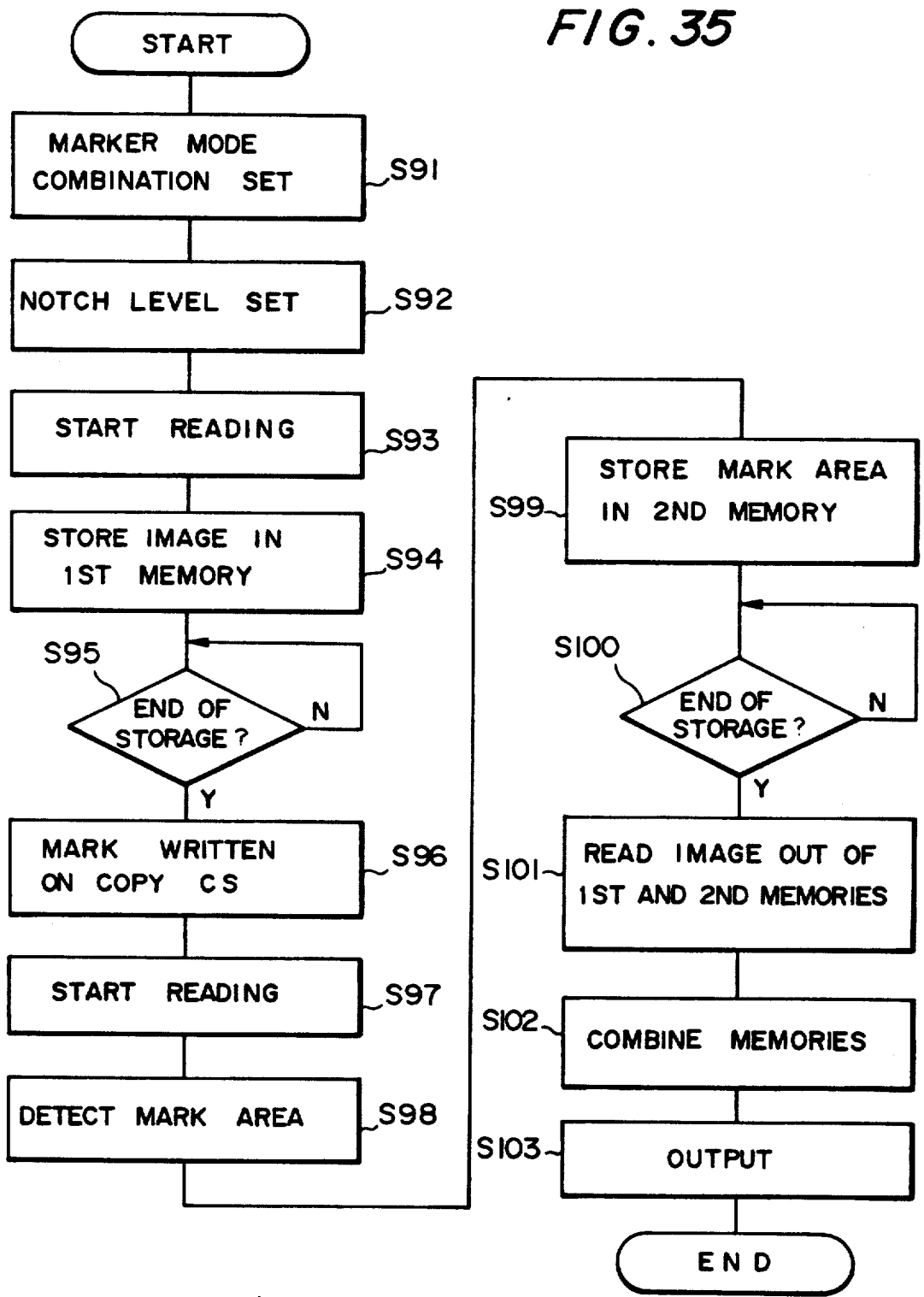
FIG. 35 is a flowchart showing another specific image editing control.
Figure 36:
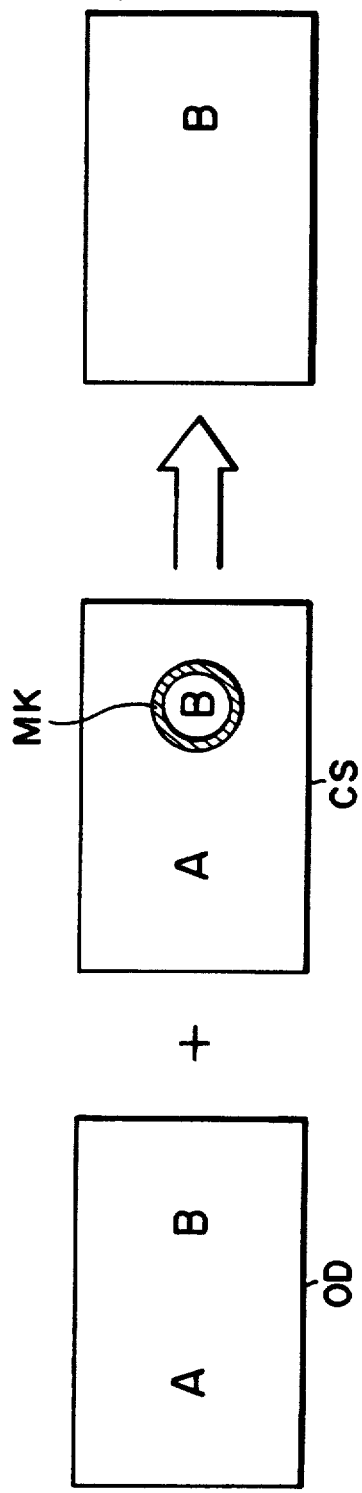
FIG. 36 illustrates a procedue associated with the flowchart of FIG. 35.

Referring to FIG. 35, there is shown the procedure wherein a document image is copied in the combination mode and the resultant copy is marked. First, the operator selects a marker mode on the operation board, not shown (step S91). Document information is written to a first memory which is one of a plurality of means for storing document information. At this instant, a particular notch level and AE level are set on the basis of the density of the document information (step S92). The scanner 12 reads the document (step S93), and the image information is stored in the first memory (step S94). On completion of storage, the document data is printed out (step S95). Since the document information is printed out on a copy sheet CS in two levels, i.e., since the output of the laser printer has two levels, a mark entered on the copy sheet CS is clearly distinguishable in density from the image information. This, coupled with the fact that the marking sheet is a copy of the desired document, a desired area can be marked easily and accurately. Thereafter, the marked copy sheet CS is read (steps S96 and S97). Only a mark area signal is picked up on the basis of the read information (step S98), and the document information is written to a second memory (step S99). After the storage (YES, step S100), the image information and the mark area signal are read out of the first and second memories, respectively (step S101). Finally, the combining circuit produces a desired edited image (steps S102 and S103). Such a procedure will be better understood with reference to FIG. 35 which indicates a trimming mode by way of example.

Figure 37:
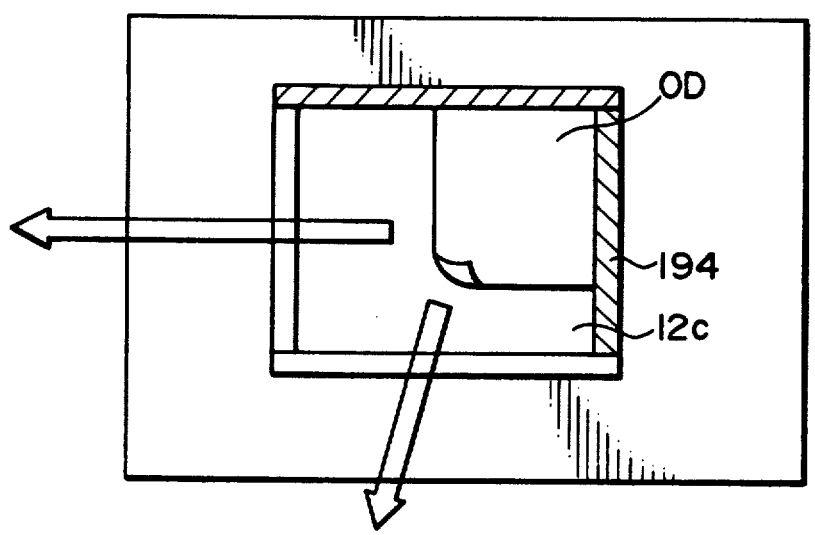
FIG. 37 is a plan view of positioning means.
Figure 38:
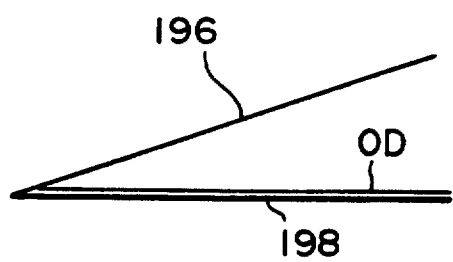
FIG. 38 is a view of alternative marking means.

As shown in FIG. 37, any of the illustrative embodiments may be provided with positioning means 194 to promote sure editing. Specifically, by abutting a document and a marking sheet against the positioning means 194 as illustrated, the operator is capable of bringing a mark area into register with a desired area of the document with ease. As FIG. 38 indicates, the marking sheet may be implemented as a carrier sheet having two flaps 196 and 198 made of synthetic resin and at least one of which is transparent. The flats 196 and 198 are connected together at one end thereof. In this configuration, a document OD is put between the flatps 196 and 198, and the transparent flat 196 that faces the surface of the document is marked. This will insure accurate register of a mark area with a desired area of a document.

Figure 39:
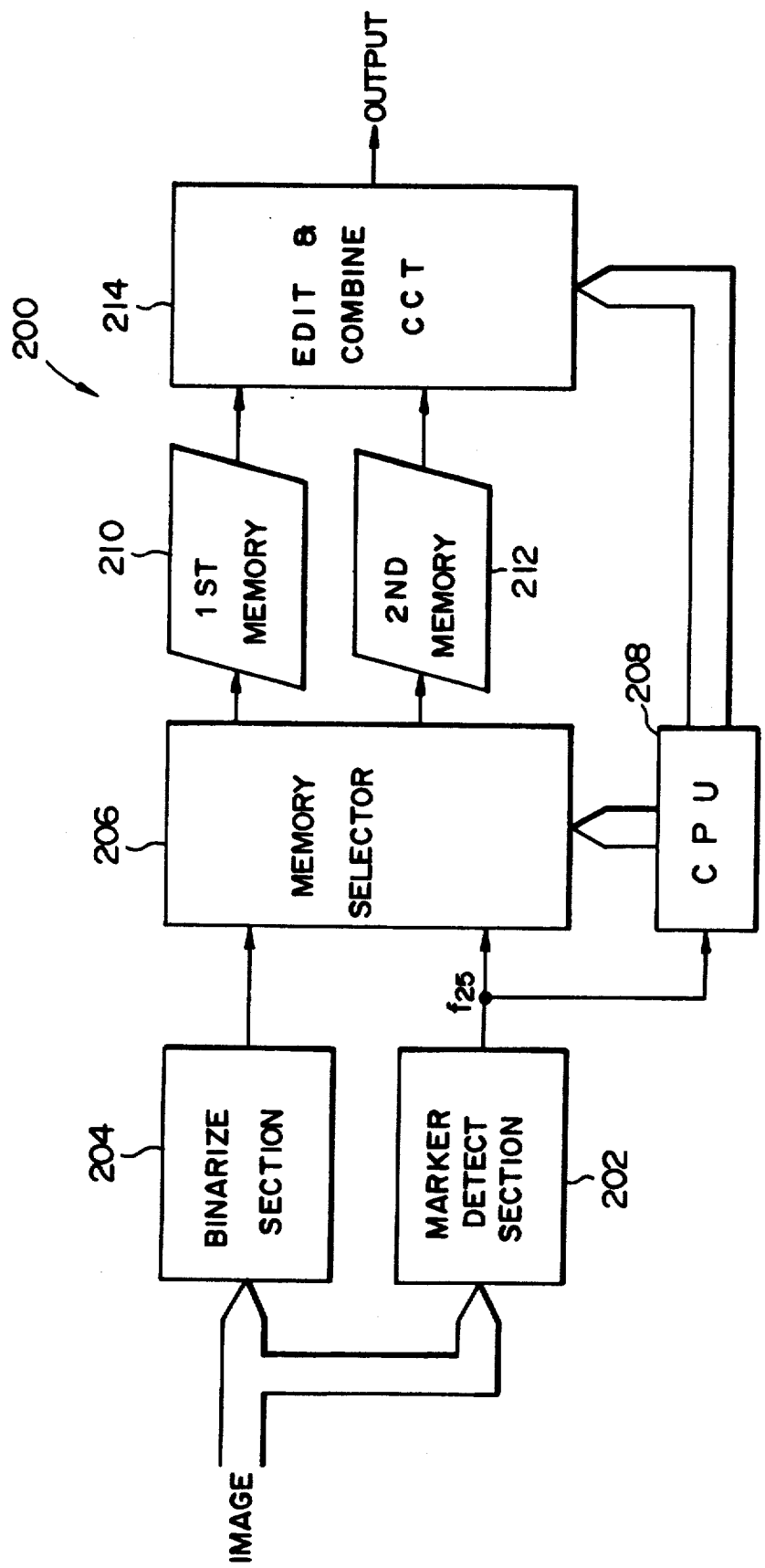
FIG. 39 is a block diagram schematically showing an automatic mode switching circuit.

While the mode has been shown and described as being switched over on an operation board by the operator, it may be switched over automatically in response to a mark detection signal, as follows. FIG. 39 shows an automatic mode switching circuit, while FIG. 40 demonstrates an automatic mode switching procedure executed by the switching circuit. As shown in FIG. 39, the automatic mode switching circuit, generally 200, is made up of a marker detecting section 202, a binarizing section 204, a memory selector 206, a CUP 208, a first memory 210, a second memory 212, and an editing and combining circuit 214.

Figure 40:
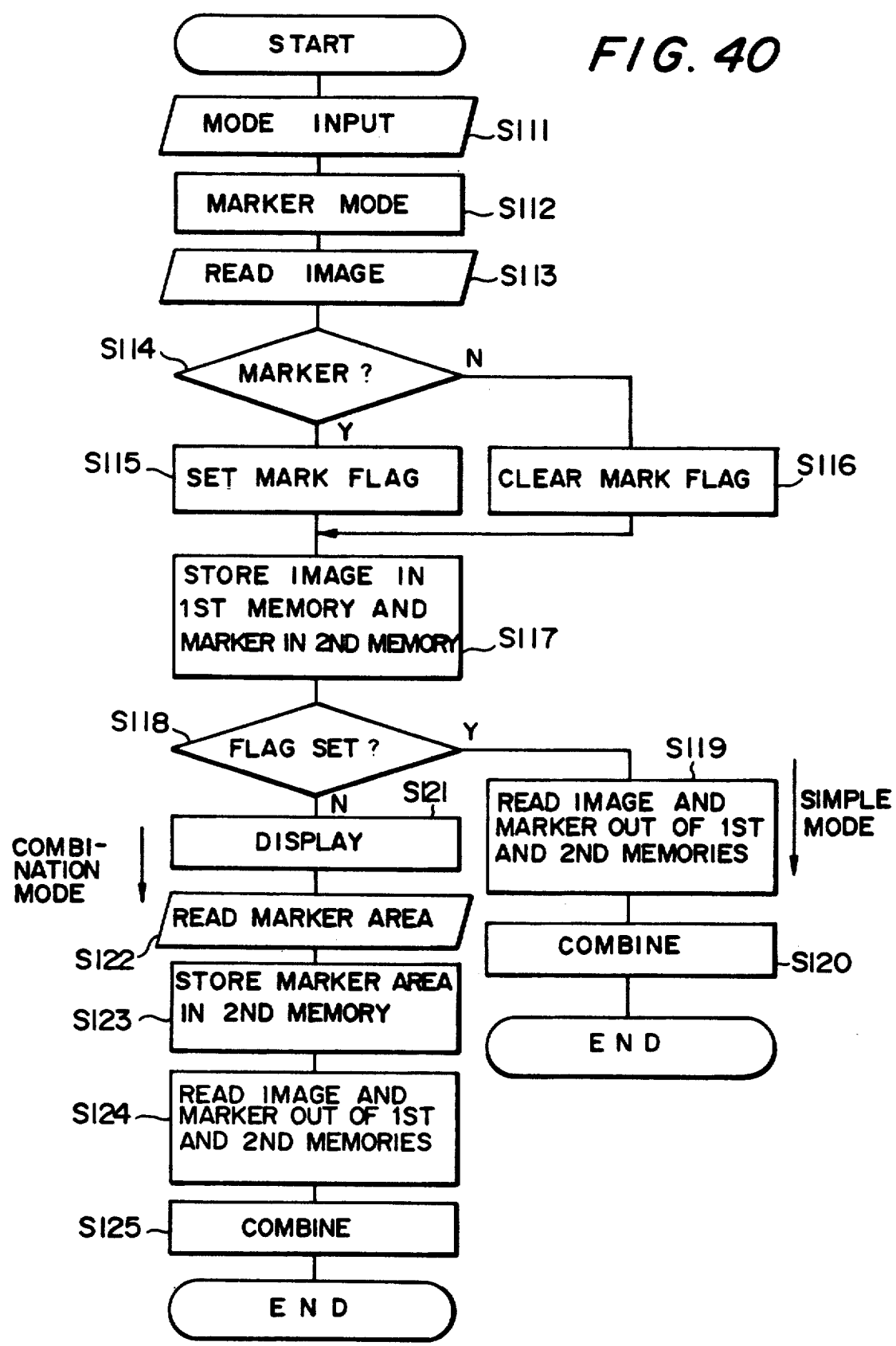
FIG. 40 is a flowchart demonstrating a specific operation of the circuit shown in FIG. 39.

The procedure shon in FIG. 40 begins with steps S111 and S112 in which the operator selects a marker mode. At the same time, the operator enters the kind of desired editing operation (trimming, masking, black-and-white inversion, etc.). These steps are the same as the steps which have been described in relation to the manual mode. Subsequently, an image is read (step S113), and the resultant image information is applied to the binarizing section 204 and marker detecting section 202. The image information binarized by the binarizing section 204 and a mark area detected by the marker detecting section 202 are fed to the memory selector 206. The detected mark area is also fed to the CPU 208. By constantly monitoring the mark signal, the CPU determines whether or not a mark is detected (step S114). When a mark is detected (YES, step S114), the CPU 208 sets a mark flag (step S115); when it is not detected (NO, step S114), the CPU 208 clears the mark flag. The memory selector 208 delivers the image information to the first memory 210 and the mark area signal to the second memory 212 (step S117). When the CPU 208 sets the mark flag, i.e., when a mark is detected (YES, step S118), the image information and the mark area are fed from the first and second memories 210 nd 212 to the combining circuit 214 (steps S119 and S120). In this manner, a simple marker mode is set up to produce an edited image.

When no marks exist on the document (NO, step S118) despite that the marker mode has been selected, the previously stated marker combining mode is set up automatically. In this mode, the image information stored in the first memory 210 is left therein. Since the second memory 212 is not loaded with a mark area, a display, not shown, is driven to urge the operator to insert a marking sheet (step S121). In response, the user marks a desired area of the document on a paper sheet and causes the scanner to read it (step S122). The resultant mark area signal is written only to the second memory 212 (step S123), while no image information is applied to the first memory 210. Such control is executed by the CPU 208 and memory selector 206. After the mark area signal has been loaded in the second memory 212, the first and second memories are combined to produce an edited image (steps S124 and S125). As stated above, either one of the simple marker mode and the combining mode is selected automatically depending on whether or not a mark signal is present, whereby efficient manipulations are promoted.

With the automatic mode switching scheme described above, it is possible to edit an image in an automatic editing mode when a document does not include the same density as a marker. When a document includes the same density as a marker, a manual mode will be set up.

Either one of the combination output mode and the mode in which a document is to be marked can be selected in matching relation to the user's demand. The automatic mode switchover promotes the ease of manipulation and thereby frees the operator from erroneous operations. The two different modes individually have the following advantages.

(1) The combination output mode enhances accurate mark detection, prevents a mark from appearing on a copy, and frees a document from contamination. Further, this mode allows even a photograph, color document or similar document whose density is relatively low to be edited by a mark.

(2) The mode in which a document is to be marked saves time and labor, compared to the combination output mode. In addition, this mode saves paper sheets because it does not involve combination.

In summary, in accordance with the present invention, a signal representative of desired area of a document can be produced and stored independently of document information. This allows the desired area to be read accurately without being effected by the density of the document and even if a mark is discontinuous. A mark is prevented from appearing on a copy. With these advantages, the present invention is capable of editing an image positively.

Various modifications will become possible for those skilled in the art after receiving the teachings of the present disclosure without departing from the scope thereof. For example, while the illustrative embodiments are constructed to trim or otherwise process a particular area surrounded by a mark, they may alternatively process an area which has been painted out out by a mark. Which of such two different kinds of areas should be processed may be determined by switching over a mode. Further, a desired mode operation such as masking or black-and-white conversion may be written on exclusive specifying means and inputted to writing means.

What is claimed is:

1. A method of detecting an area of a document where an image to be produced exists, comprising the steps of:
    (a) reading an image printed on a document to generate image information;
    (b) storing said image information;
    (c) reading position information associated with said docmuent from a sheet, other than said document, on which said position information is entered; and
    (d) processing said image information on the basis of said position information .

2. A method as claimed in claim 1, wherein step (c) comprises (e) using a copy of said document as said sheet.

3. A method as claimed in claim 1, wherein step (c) comprises (e) using a blank copy as said sheet.

4. A method of detecting an area of a document where an image to be produced exists, comprising the steps of:
- (a) reading an image printed on a document;
- (b) determining whether or not position information associated with said document is included in a signal representative of said document;
- (c) determining whether or not a processing mode for editing an image has been set up; and
- (d) discharging, when said processing mode has been set up and said position data associated with said document does not included said signal, a paper sheet for specifying said position information.

5. A method as claimed in claim 4, wherein step (d) comprises (e) using a copy of said document as said paper sheet.

6. A method as claimed in claim 4, wherein step (d) comprises (e) using a blank copy as said paper sheet.

* * * * *